(12) United States Patent
Khandekar et al.

(10) Patent No.: US 8,027,372 B2
(45) Date of Patent: Sep. 27, 2011

(54) SIGNAL ACQUISITION IN A WIRELESS COMMUNICATION SYSTEM

(75) Inventors: Aamod Khandekar, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 884 days.

(21) Appl. No.: 11/022,482

(22) Filed: Dec. 22, 2004

(65) Prior Publication Data

US 2006/0209927 A1 Sep. 21, 2006

Related U.S. Application Data

(60) Provisional application No. 60/580,809, filed on Jun. 18, 2004.

(51) Int. Cl.
*H04B 1/00* (2006.01)

(52) U.S. Cl. ........ 375/146; 375/135; 375/141; 375/134; 375/137; 370/500; 370/510; 370/345; 370/442; 370/508; 370/320; 370/321; 370/344; 370/347; 370/537; 370/324; 370/337; 370/294

(58) Field of Classification Search .................. 375/130, 375/134, 146, 135, 141, 133, 137; 370/500, 370/510, 350, 345, 442, 508, 512, 537, 320, 370/321, 337, 344, 347, 458, 294, 324, 90; 455/102, 103, 105

See application file for complete search history.

(56) References Cited

U.S. PATENT DOCUMENTS

| 5,781,543 | A  | 7/1998 | Ault et al. |
| 6,137,847 | A  | 10/2000 | Stott et al. |
| 6,414,986 | B1 | 7/2002 | Usui |
| 6,430,200 | B1 | 8/2002 | Han et al. |

(Continued)

FOREIGN PATENT DOCUMENTS

CL 223104 6/2005

(Continued)

OTHER PUBLICATIONS

ETSI ETS 300 744; "Digital Video Broadcasting (DVB); Framing structure, channel coding and modulation for digital Terrestrial television (DVB-T)" Mar. 1997, pp. 25-34.

(Continued)

*Primary Examiner* — Dac Ha
*Assistant Examiner* — Rahel Guarino
(74) *Attorney, Agent, or Firm* — Sandip S. Minhas; Peng Zhu

(57) ABSTRACT

Each base station transmits a TDM pilot 1 having multiple instances of a pilot-1 sequence generated with a PN1 sequence and a TDM pilot 2 having at least one instance of a pilot-2 sequence generated with a PN2 sequence. Each base station is assigned a specific PN2 sequence that uniquely identifies that base station. A terminal uses TDM pilot 1 to detect for the presence of a signal and uses TDM pilot 2 to identify base stations and obtain accurate timing. For signal detection, the terminal performs delayed correlation on received samples and determines whether a signal is present. If a signal is detected, the terminal performs direct correlation on the received samples with PN1 sequences for $K_1$ different time offsets and identifies $K_2$ strongest TDM pilot 1 instances. For time synchronization, the terminal performs direct correlation on the received samples with PN2 sequences to detect for TDM pilot 2.

81 Claims, 10 Drawing Sheets

U.S. PATENT DOCUMENTS

| | | |
|---|---|---|
| 6,449,481 B1 | 9/2002 | Kwon et al. |
| 6,483,829 B1 | 11/2002 | Yamamoto |
| 6,556,551 B1 | 4/2003 | Schwartz |
| 6,574,205 B1 | 6/2003 | Sato |
| 6,795,489 B2 | 9/2004 | Joshi et al. |
| 6,888,805 B2 | 5/2005 | Bender |
| 6,929,539 B2 | 8/2005 | Schutz et al. |
| 7,051,725 B2 | 5/2006 | Ikemoto |
| 7,120,133 B1 * | 10/2006 | Joo et al. .............. 370/328 |
| 7,197,692 B2 | 3/2007 | Sutivong et al. |
| 7,583,584 B2 | 9/2009 | Wang et al. |
| 7,751,374 B2 | 7/2010 | Donovan |
| 7,756,211 B2 | 7/2010 | Kim et al. |
| 2002/0154610 A1 | 10/2002 | Tiedemann, Jr. et al. |
| 2002/0159422 A1 * | 10/2002 | Li et al. .............. 370/342 |
| 2002/0193104 A1 | 12/2002 | Scherzer et al. |
| 2002/0196752 A1 | 12/2002 | Attar et al. |
| 2003/0035405 A1 | 2/2003 | Nagatani et al. |
| 2004/0058081 A1 | 3/2004 | Potyrailo et al. |
| 2004/0233870 A1 | 11/2004 | Willenegger et al. |
| 2005/0063298 A1 * | 3/2005 | Ling et al. .............. 370/208 |
| 2005/0147025 A1 | 7/2005 | Auer |
| 2005/0163262 A1 | 7/2005 | Gupta |
| 2005/0201368 A1 | 9/2005 | Periyalwar et al. |
| 2005/0281242 A1 | 12/2005 | Sutivong et al. |
| 2005/0281290 A1 | 12/2005 | Khandekar et al. |
| 2006/0019694 A1 | 1/2006 | Sutivong et al. |
| 2006/0028976 A1 | 2/2006 | Park et al. |
| 2006/0135162 A1 | 6/2006 | Julian et al. |
| 2006/0140313 A1 | 6/2006 | Futami et al. |
| 2006/0183481 A1 | 8/2006 | Furukawa et al. |
| 2006/0209752 A1 | 9/2006 | Wijngaarden et al. |
| 2007/0173276 A1 | 7/2007 | Love et al. |
| 2008/0123616 A1 | 5/2008 | Lee |

FOREIGN PATENT DOCUMENTS

| | | |
|---|---|---|
| CL | 147305 | 1/2006 |
| CL | 147405 | 1/2006 |
| CL | 147605 | 1/2006 |
| JP | 10190625 | 7/1998 |
| KR | 1020000067168 | 11/2000 |
| RU | 2145152 C1 | 1/2000 |
| RU | 2149509 | 5/2000 |
| RU | 2157592 | 10/2000 |
| RU | 2178239 C2 | 1/2002 |
| WO | 9925080 | 5/1999 |
| WO | WO0065736 | 11/2000 |
| WO | WO2005074222 | 8/2005 |
| WO | 2005022797 | 10/2005 |
| WO | WO2006000091 | 1/2006 |
| WO | WO2007137276 | 11/2007 |

OTHER PUBLICATIONS

Yeh., et al.: "OFDM System Channel Estimation Using Time-Domain Training Sequence for Mobile Reception of Digital Terrestrial Broadcasting," IEEE Transactions on Broadcasting, vol. 46, Issue 3, Sep. 2000 pp. 215-220.

International Search Report—PCT/US05/021051, International Search Authority—European Patent Office—Dec. 14, 2005.

UMTS Terrestrial Radio Access Concept Evaluation ETSI Technical Report, Dec. 1997, pp. 47-48, XP002109765.

European Search Report—EP10172424, Search Authority—The Hague Patent Office, Sep. 22, 2010.

European Search Report—EP10172427, Search Authority—The Hague Patent Office, Sep. 21, 2010.

European Search Report—EP10172428, Search Authority—The Hague Patent Office, Sep. 21, 2010.

Written Opinion—PCT/US05/021051, International Search Authority—European Patent Office—Dec. 14, 2005.

Kwang, Soon Kim et al.: "A Preamble-Based Cell Searching Technique for OFDM Cellular Systems." Vehicular Technology Conference, 2003, vol. 4, pp. 2471-2475.

* cited by examiner

SIGNAL ACQUISITION IN A WIRELESS COMMUNICATION SYSTEM

CROSS-REFERENCE TO RELATED APPLICATION

This application claims priority to U.S. Provisional Patent Application Ser. No. 60/580,809, filed Jun. 18, 2004 which is incorporated herein by reference in its entirety.

BACKGROUND

I. Field

The present invention relates generally to communication, and more specifically to techniques for performing signal acquisition in a wireless communication system.

II. Background

In a communication system, a base station processes (e.g., encodes and symbol maps) data to obtain modulation symbols, and further processes the modulation symbols to generate a modulated signal. The base station then transmits the modulated signal via a communication channel. The system may use a transmission scheme whereby data is transmitted in frames, with each frame having a particular time duration. Different types of data (e.g., traffic/packet data, overhead/control data, pilot, and so on) may be sent in different parts of each frame.

A wireless terminal in the system may not know which base stations, if any, near its vicinity are transmitting. Furthermore, the terminal may not know the start of each frame for a given base station, the time at which each frame is transmitted by the base station, or the propagation delay introduced by the communication channel. The terminal performs signal acquisition to detect for transmissions from base stations in the system and to synchronize to the timing and frequency of each detected base stations of interest. Via the signal acquisition process, the terminal can ascertain the timing of each detected base station and can properly perform the complementary demodulation for that base station.

The base stations typically expend system resources to support signal acquisition, and the terminals also consume resources to perform acquisition. Since signal acquisition is overhead needed for data transmission, it is desirable to minimize the amount of resources used by both the base stations and terminals for acquisition.

There is therefore a need in the art for techniques to efficiently perform signal acquisition in a wireless communication system.

SUMMARY

Techniques to efficiently perform signal acquisition in a wireless communication system are described herein. In an embodiment, each base station transmits two time division multiplexed (TDM) pilots. The first TDM pilot (or "TDM pilot 1") is composed of multiple instances of a pilot-1 sequence that is generated with a first pseudo-random number (PN) sequence (or "PN 1" sequence). Each instance of the pilot-1 sequence is a copy or replica of the pilot-1 sequence. The second TDM pilot (or "TDM pilot 2") is composed of at least one instance of a pilot-2 sequence that is generated with a second PN sequence (or "PN2" sequence). Each base station is assigned a specific PN2 sequence that uniquely identifies that base station among neighboring base stations. To reduce computation for signal acquisition, the available PN2 sequences for the system may be arranged into $M_1$ sets. Each set contains $M_2$ PN2 sequences and is associated with a different PN1 sequence. Thus, $M_1$ PN1 sequences and $M_1 \cdot M_2$ PN2 sequences are available for the system.

A terminal may use TDM pilot 1 to detect for the presence of a signal, obtain timing, and estimate frequency error. The terminal may use TDM pilot 2 to identify a specific base station transmitting a TDM pilot2. The use of two TDM pilots for signal detection and time synchronization can reduce the amount of processing needed for signal acquisition.

In an embodiment for signal detection, the terminal performs a delayed correlation on received samples in each sample period, computes a delayed correlation metric for the sample period, and compares this metric against a first threshold to determine whether a signal is present. If a signal is detected, then the terminal obtains coarse timing based on a peak in the delayed correlation. The terminal then performs direct correlation on the received samples with PN1 sequences for $K_1$ different time offsets within an uncertainty window and identifies $K_2$ strongest TDM pilot1 instances, where $K_1 \leq 1$ and $K_2 \leq 1$. If each PN1 sequence is associated with $M_2$ PN sequences, then each detected TDM pilot1 instance is associated with $M_2$ pilot-2 hypotheses. Each pilot-2 hypothesis corresponds to a specific time offset and a specific PN2 sequence for TDM pilot2.

In an embodiment for time synchronization, the terminal performs direct correlation on the received samples with PN2 sequences for the different pilot-2 hypotheses to detect for TDM pilot 2. The terminal only needs to evaluate $M_2$ PN sequences for each detected TDM pilot1 instance, instead of all $M_1 \cdot M_2$ possible PN2 sequences. The terminal computes a direct correlation metric for each pilot-2 hypothesis and compares this metric against a second threshold to determine whether TDM pilot 2 is present. For each detected TDM pilot 2 instance, the base station transmitting the TDM pilot 2 is identified based on the PN2 sequence for the pilot-2 hypothesis, and the timing for the base station is given by the time offset for the hypothesis.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The signal acquisition techniques described herein may be used for single-carrier and multi-carrier communication systems. Furthermore, one or more TDM pilots may be used to facilitate signal acquisition. For clarity, certain aspects of the techniques are described below for a specific TDM pilot transmission scheme in a multi-carrier system that utilizes orthogonal frequency division multiplexing (OFDM). OFDM is a multi-carrier modulation technique that effectively partitions the overall system bandwidth into multiple ($N_F$) orthogonal frequency subbands. These subbands are also called tones, subcarriers, bins, and frequency channels. With OFDM, each subband is associated with a respective sub-carrier that may be modulated with data.

Figure 1:
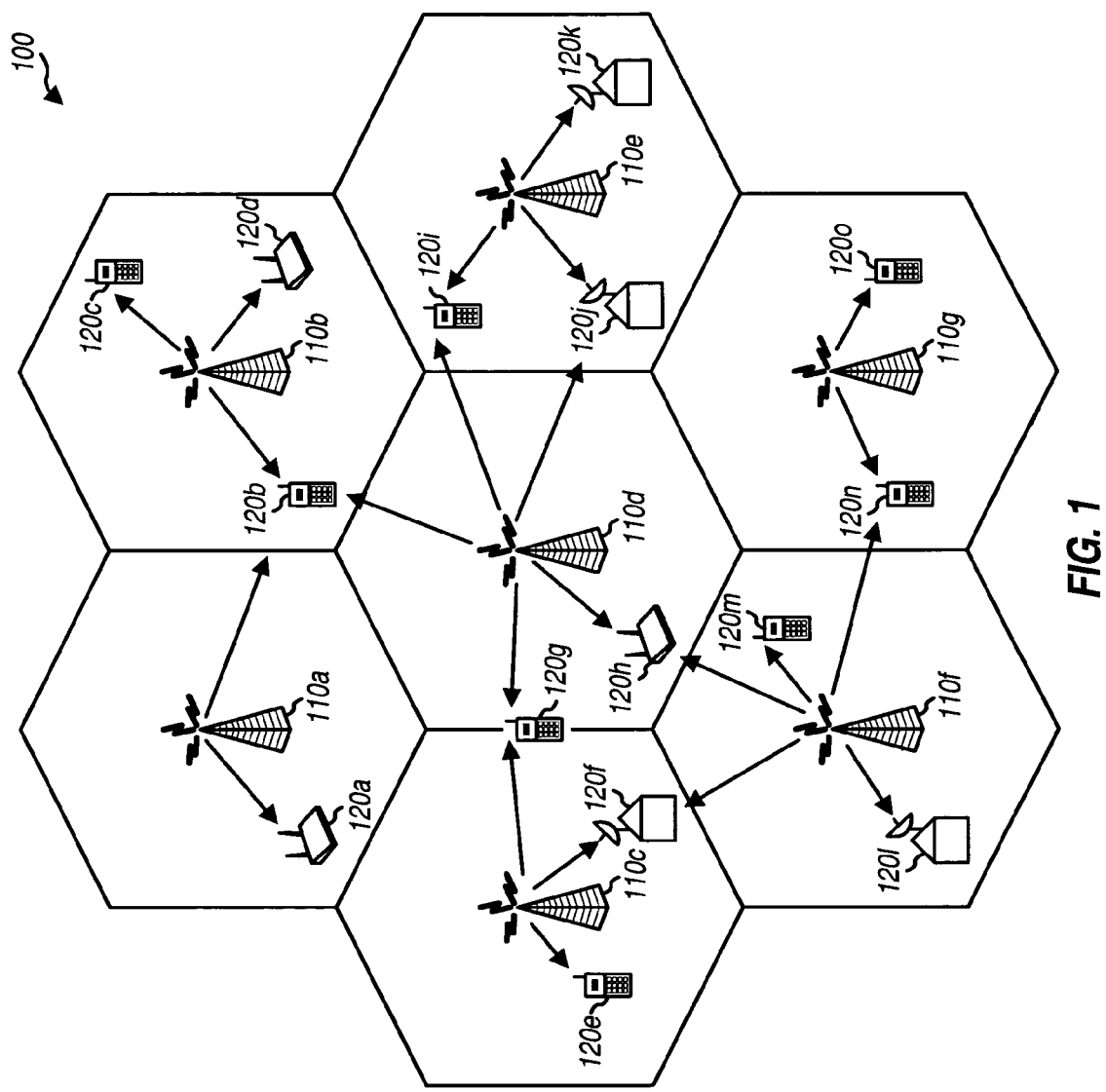
FIG. 1 shows a wireless communication system.

FIG. 1 shows a wireless communication system 100. System 100 includes a number of base stations 110 that support communication for a number of wireless terminals 120. A base station is a fixed station used for communicating with the terminals and may also be referred to as an access point, a Node B, or some other terminology. Terminals 120 are typically dispersed throughout the system, and each terminal may be fixed or mobile. A terminal may also be referred to as a mobile station, a user equipment (UE), a wireless communication device, or some other terminology. Each terminal may communicate with one or multiple base stations on the forward and reverse links at any given moment. The forward link (or downlink) refers to the communication link from the base stations to the terminals, and the reverse link (or uplink) refers to the communication link from the terminals to the base stations. For simplicity, FIG. 1 only shows forward link transmissions.

Each base station 110 provides communication coverage for a respective geographic area. The term "cell" can refer to a base station and/or its coverage area, depending on the context in which the term is used. To increase capacity, the coverage area of each base station may be partitioned into multiple regions (e.g., three regions). Each region may be served by a corresponding base transceiver subsystem (BTS). The term "sector" can refer to a BTS and/or its coverage area, depending on the context in which the term is used. For a sectorized cell, the base station for that cell typically includes the BTSs for all of the sectors of that cell. For simplicity, in the following description, the term "base station" is used generically for both a fixed station that serves a cell and a fixed station that serves a sector. Thus, a "base station" in the following description may be for a cell or a sector, depending on whether the system has unsectorized or sectorized cells, respectively.

Figures 2A, 2B:
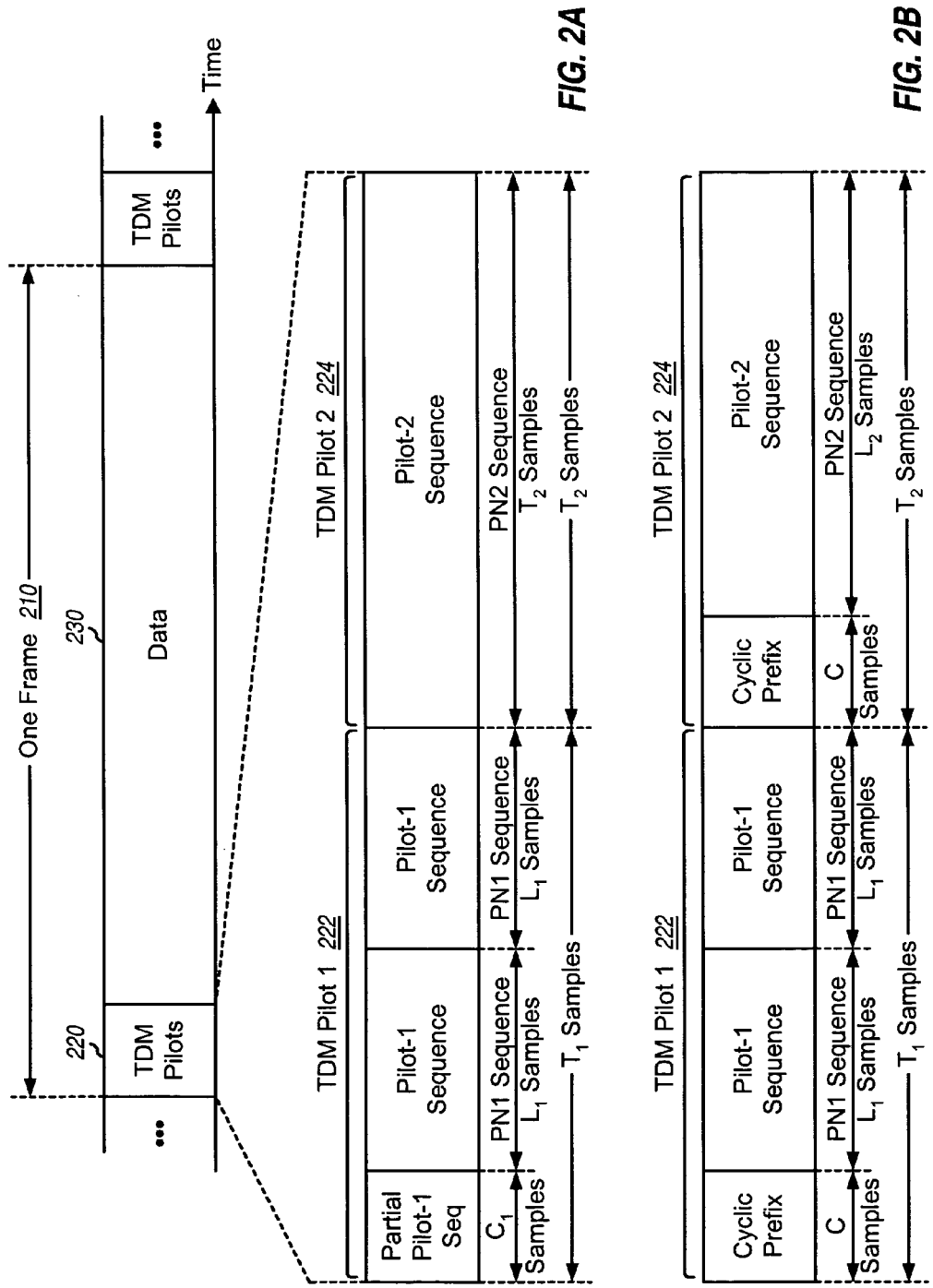
FIG. 2A shows TDM pilots 1 and2 generated in the time domain.
FIG. 2B shows TDM pilots 1 and2 generated in the frequency domain.

FIG. 2A shows an exemplary pilot and data transmission scheme for the forward link in system 100. Each base station transmits data and pilot in frames, with each frame 210 having a predetermined time duration. A frame may also be referred to as a slot or some other terminology. In an embodiment, each frame 210 includes a field 220 for TDM pilots and a field 230 for data. In general, a frame may include any number of fields for any type of transmission. A transmission interval refers to a time interval in which the TDM pilots are transmitted once. In general, a transmission interval may be a fixed time duration (e.g., a frame) or a variable time duration.

For the embodiment shown in FIG. 2A, field 220 includes a subfield 222 for TDM pilot 1 and a subfield 224 for TDM pilot 2. TDM pilot 1 has a total length of $T_1$ samples and comprises $S_1$ identical pilot-1 sequences, where in general $S_1 \geq 1$. TDM pilot 2 has a total length of $T_2$ samples and comprises $S_2$ identical pilot-2 sequences, where in general $S_2 \geq 1$. Thus, there may be one or multiple pilot-1 sequence instances for TDM pilot 1 and one or multiple pilot-2 sequence instances for TDM pilot2. TDM pilots 1 and 2 may be generated in the time domain or the frequency domain (e.g., with OFDM).

FIG. 2A also shows an embodiment of TDM pilots1 and 2 generated in the time domain. For this embodiment, each pilot-1 sequence is generated with a PN1 sequence having $L_1$ PN chips, where $L_1 \geq 1$. Each PN chip may take on a value of either +1 or −1 and is transmitted in one sample/chip period. TDM pilot1 comprises $S_1$ complete pilot-1 sequences and, if $S_1 \cdot L_1 < T_1$, a partial pilot-1 sequence of length $C_1$, where $C_1 = T_1 - S_1 \cdot L_1$. The total length of TDM pilot 1 is thus $T_1 = S_1 \cdot L_1 + C_1$. For the embodiment shown in FIG. 2A, TDM pilot2 comprises one complete pilot-2sequence generated with a PN2sequence of length $T_2$. In general, TDM pilot 2 may comprise $S_2$ complete pilot-2 sequences generated with a PN2 sequence of length $L_2$ and, if $S_2 \cdot L_2 < T_2$, a partial pilot-2 sequence of length $C_2$, where $C_2 = T_2 - S_2 \cdot L_2$. The total length of TDM pilot 2 is then $T_2 = S_2 \cdot L_2 + C_2$.

As used herein, a PN sequence may be any sequence of chips that may be generated in any manner and preferably has good correlation properties. For example, a PN sequence may be generated with a generator polynomial, as is known in the art. The PN sequence for each base station (e.g., each sector) may also be a scrambling code used to randomize data. In this case, the TDM pilots may be generated by applying the scrambling code to a sequence of all ones or all zeros.

FIG. 2B shows an embodiment of TDM pilots1 and2 generated in the frequency domain using OFDM. For this embodiment, TDM pilot1 comprises $L_1$ pilot symbols that are transmitted on $L_1$ subbands, one pilot symbol per subband used for TDM pilot1. The $L_1$ subbands are uniformly distributed across the $N_F$ total subbands and are equally spaced apart by $S_1$ subbands, where $S_1 = N_F/L_1$ and $S_1 \geq 1$. For example, if $N_F = 512$, $L_1 = 256$, and $S_1 = 2$, then 256 pilot symbols are transmitted on 256 subbands that are spaced apart by two subbands. Other values may also be used for $N_F$, $L_1$, and $S_1$. The $L_1$ pilot symbols for the $L_1$ subbands and $N_F - L_1$ zero signal values for the remaining subbands are transformed to the time domain with an $N_F$-point inverse discrete Fourier transform (IDFT) to generate a "transformed" symbol that contains $N_F$ time-domain samples. This transformed symbol has $S_1$ identical pilot-1 sequences, with each pilot-1 sequence containing $L_1$ time-domain samples. A pilot-1 sequence may also be generated by performing an $L_1$-point IDFT on the $L_1$ pilot symbols for TDM pilot1. For OFDM, C rightmost samples of the transformed symbol are often copied and appended in front of the transformed symbol to generate an OFDM symbol that contains $N_F + C$ samples. The repeated portion is often called a cyclic prefix and is used to combat inter-symbol interference (ISI). For example, if $N_F = 512$ and $C = 32$, then each OFDM symbol contains 544 samples. Other OFDM subband structures with different numbers of total subbands and cyclic prefix lengths may also be used.

The PN1 sequence may be applied in the frequency domain by multiplying the $L_1$ pilot symbols with the $L_1$ chips of the PN1 sequence. The PN1 sequence may also be applied in the time domain by multiplying the $L_1$ time-domain samples for each pilot-1 sequence with the $L_1$ chips of the PN1 sequence.

TDM pilot2 may be generated in the frequency domain in similar manner as described above for TDM pilot1. For TDM pilot 2, $L_2$ pilot symbols are transmitted on $L_2$ subbands that are evenly spaced apart by $S_2$ subbands, where $S_2=N/L_2$ and $S_2>1$. The PN2 sequence may be applied in the time or frequency domain. If TDM pilots1 and 2 are generated in the frequency domain, then the pilot-1 and pilot-2 sequences contain complex values instead of ±1. For the embodiment shown in FIG. 2B, TDM pilots1 and 2 are each sent within one OFDM symbol. In general, each TDM pilot may include any number of OFDM symbols.

Neighboring base stations may use the same or different PN1 sequences for TDM pilot1. A set of $M_1$ PN1 sequences may be formed, and each base station may use one of the $M_1$ PN1 sequences in this set. To reduce complexity, $M_1$ may be chosen to be a small positive number. In an embodiment, neighboring base stations use different PN2 sequences for TDM pilot 2, and the PN2 sequence for each base station is used to uniquely identify that base station among neighboring base stations.

To reduce computation for signal acquisition, each PN1 sequence may be associated with a different set of $M_2$ PN2 sequences. A composite set of $M_1 \cdot M_2$ different PN2sequences is then available. Each base station may be assigned one of the PN2 sequences in the composite set as well as the PN1 sequence associated with the PN2 sequence assigned to the base station. Each base station thus uses a pair of PN1 and PN2 sequences that is different from the PN1 and PN2 sequence pairs used by neighboring base stations. $M_1$ and $M_2$ may be selected to be reasonably small values to reduce complexity but sufficiently large to ensure that no terminal will observe two base stations with the same PN2 sequence (e.g., $M_1 \cdot M_2=256$).

A terminal may use TDM pilot1 to detect for the presence of a signal, obtain coarse timing, and estimate frequency error. The terminal may use TDM pilot2 to identify a specific base station transmitting a TDM pilot 2 and to obtain more accurate timing (or time synchronization). The use of two separate TDM pilots for signal detection and time synchronization can reduce the amount of processing needed for signal acquisition, as described below. The duration or length of each TDM pilot may be selected based on a tradeoff between detection performance and the amount of overhead incurred for that TDM pilot. In an embodiment, TDM pilot1 comprises two complete pilot-1 sequences each having a length of 256 chips (or $S_1=2$ and $L_1=256$), and TDM pilot2 comprises one complete pilot-2 sequence having a length of 512 or 544 chips (or $S_2=1$, and $L_2=544$ for FIG. 2A and $L_2=512$ for FIG. 2B). In general, TDM pilot1 may comprise any number of pilot-1 sequences, which may be of any length, and TDM pilot 2 may also comprise any number of pilot-2 sequences, which may also be of any length.

Figure 3A:
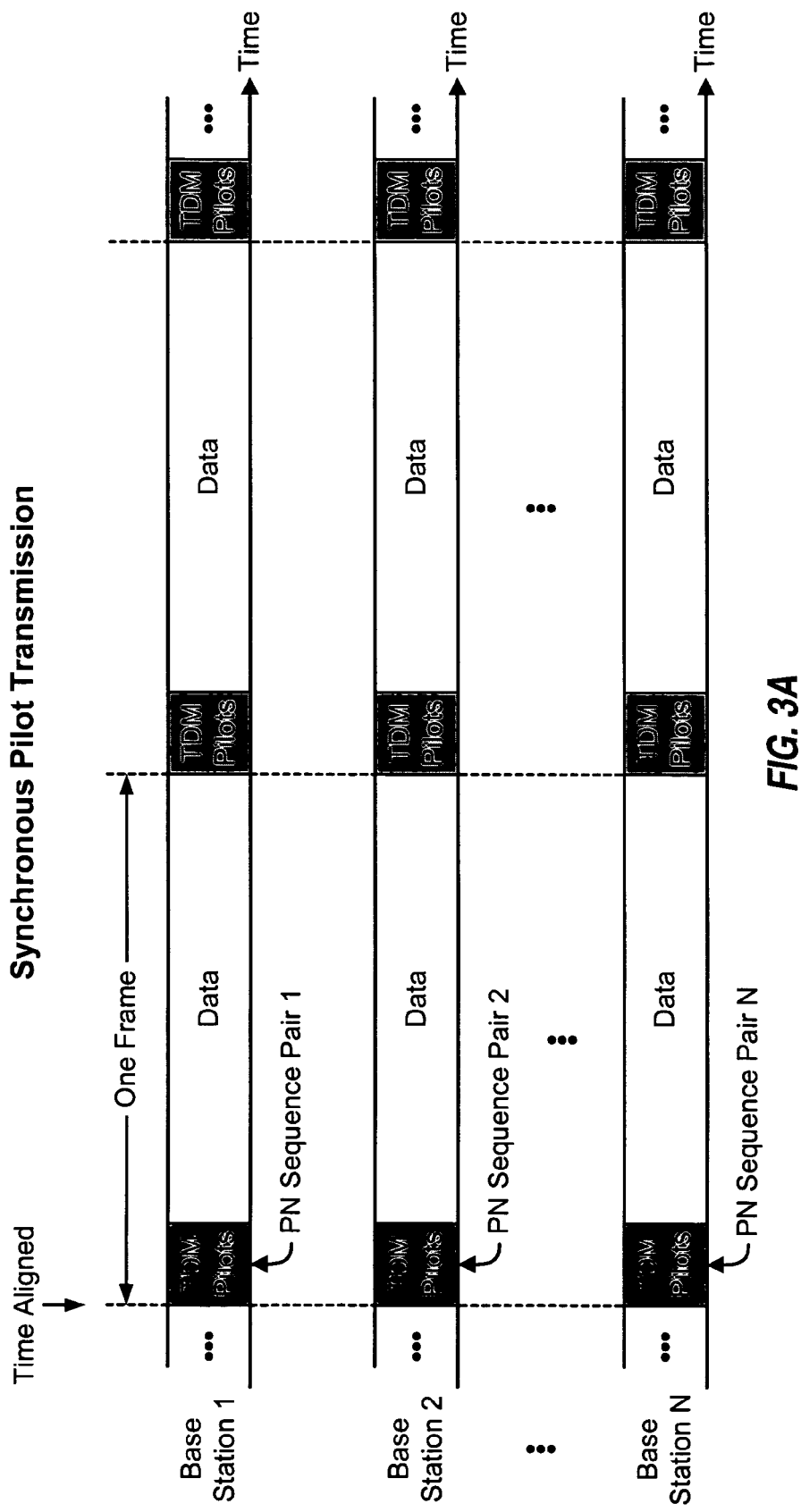
FIG. 3A shows synchronous pilot transmission on the forward link.

FIG. 3A shows a synchronous pilot transmission scheme for the forward link. For this scheme, the base stations in the system are synchronous and transmit their TDM pilots at approximately the same time. A terminal can receive the TDM pilots from all base stations at approximately the same time, with any timing skew between the base stations being due to differences in propagation delays and possibly other factors. By synchronizing the TDM pilots from different base stations, interference by the TDM pilots from one base station on data transmissions by other base stations is avoided, which may improve data detection performance. Furthermore, interference from the data transmissions on the TDM pilots is also avoided, which may improve acquisition performance.

Figure 3B:
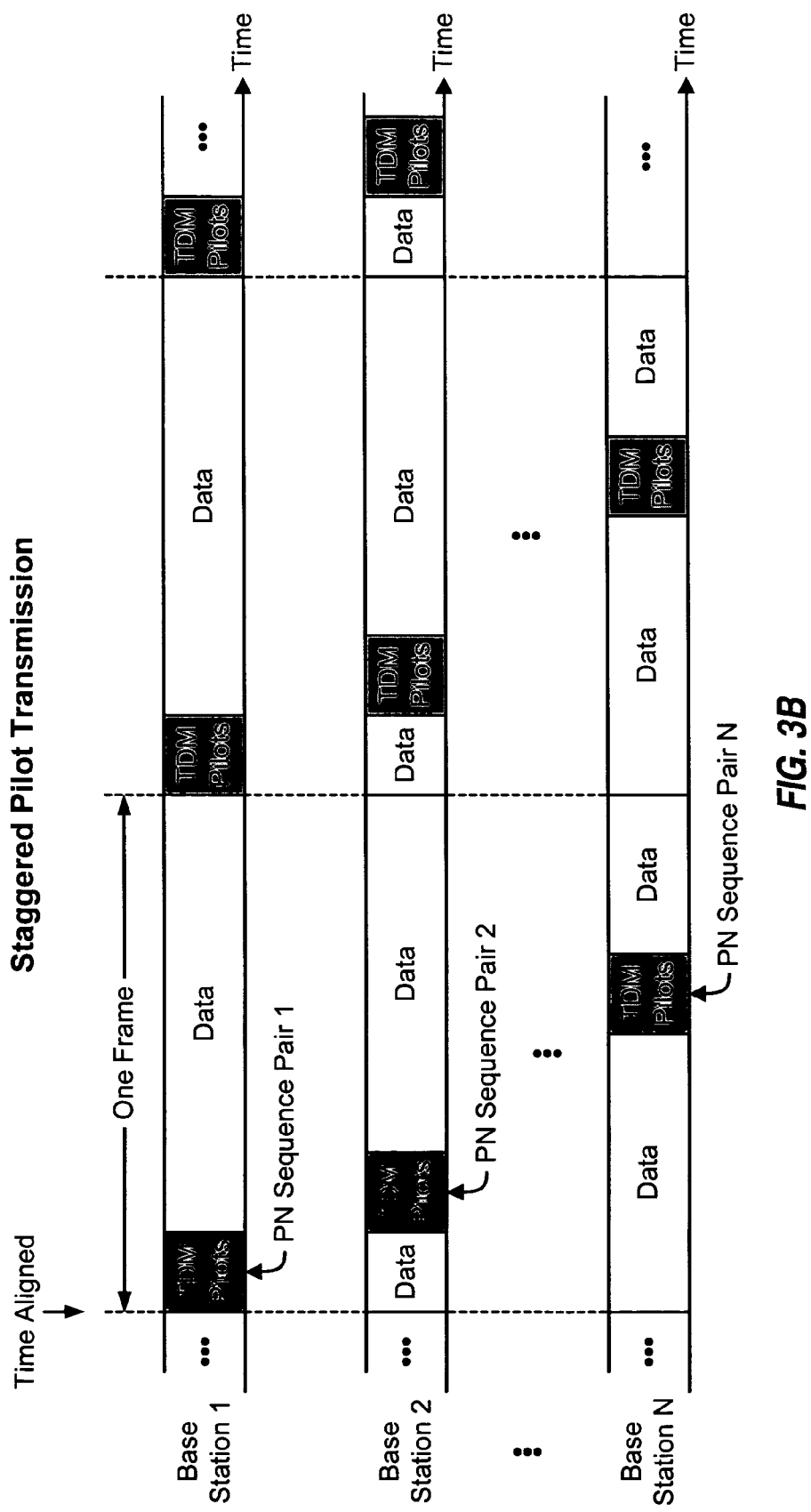
FIG. 3B shows staggered pilot transmission on the forward link.

FIG. 3B shows a staggered pilot transmission scheme for the forward link. For this scheme, the base stations in the system are synchronous but transmit their TDM pilots at different times so that the TDM pilots are staggered. The base stations may be identified by the time at which they transmit their TDM pilots. The same PN sequence may be used for all base stations, and the processing for signal acquisition may be reduced dramatically with all base stations using the same PN sequence. For this scheme, the pilot transmission from each base station observes interference from the data transmissions from neighboring base stations.

Figure 3C:
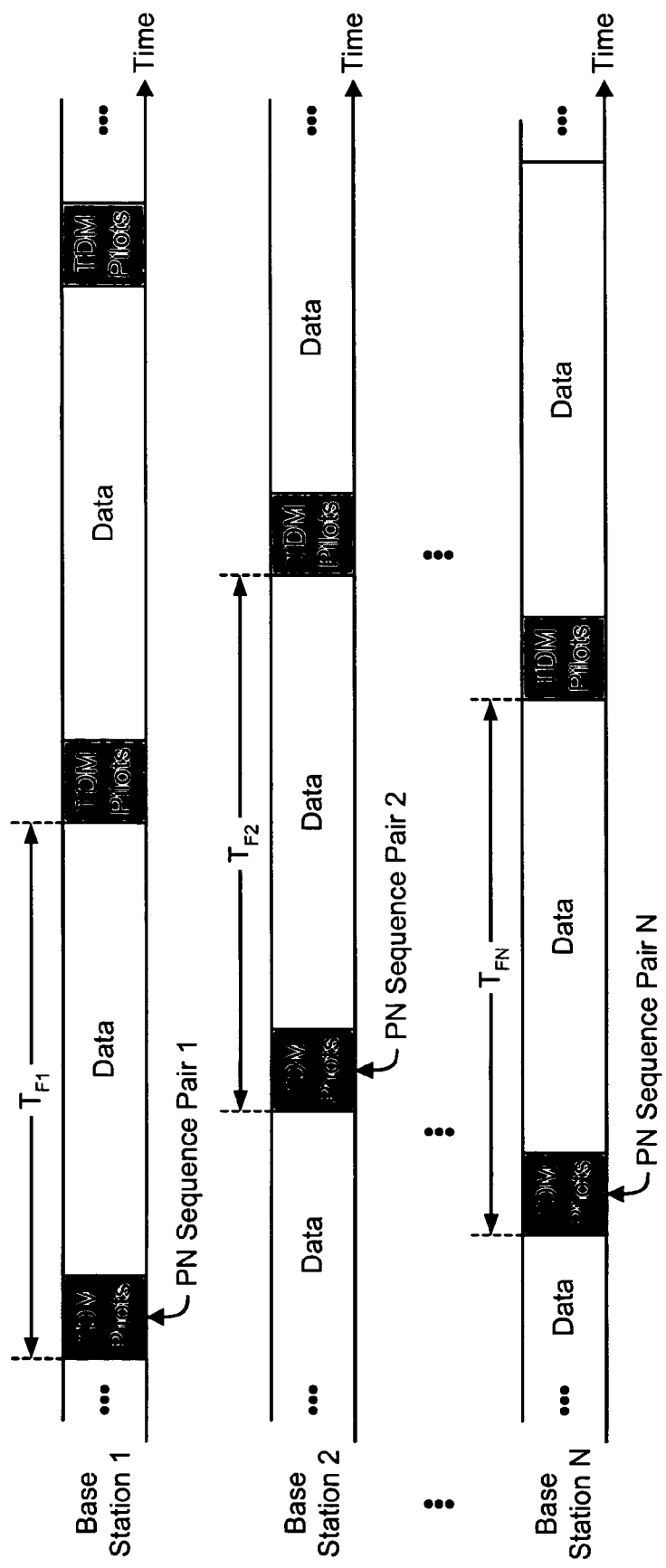
FIG. 3C shows asynchronous pilot transmission on the forward link.

FIG. 3C shows an asynchronous pilot transmission scheme for the forward link. For this scheme, the base stations in the system are asynchronous and each base station transmits its TDM pilots based on its timing. The TDM pilots from different base stations may thus arrive at different times at the terminal.

For the synchronous pilot transmission scheme shown in FIG. 3A, the TDM pilot transmission from each base station may observe the same interference from the TDM pilot transmissions from neighboring base stations in each frame. In this case, averaging the TDM pilots over multiple frames does not provide averaging gain since the same interference is present in each frame. The interference may be varied by changing the TDM pilots across frames.

Figure 3D:
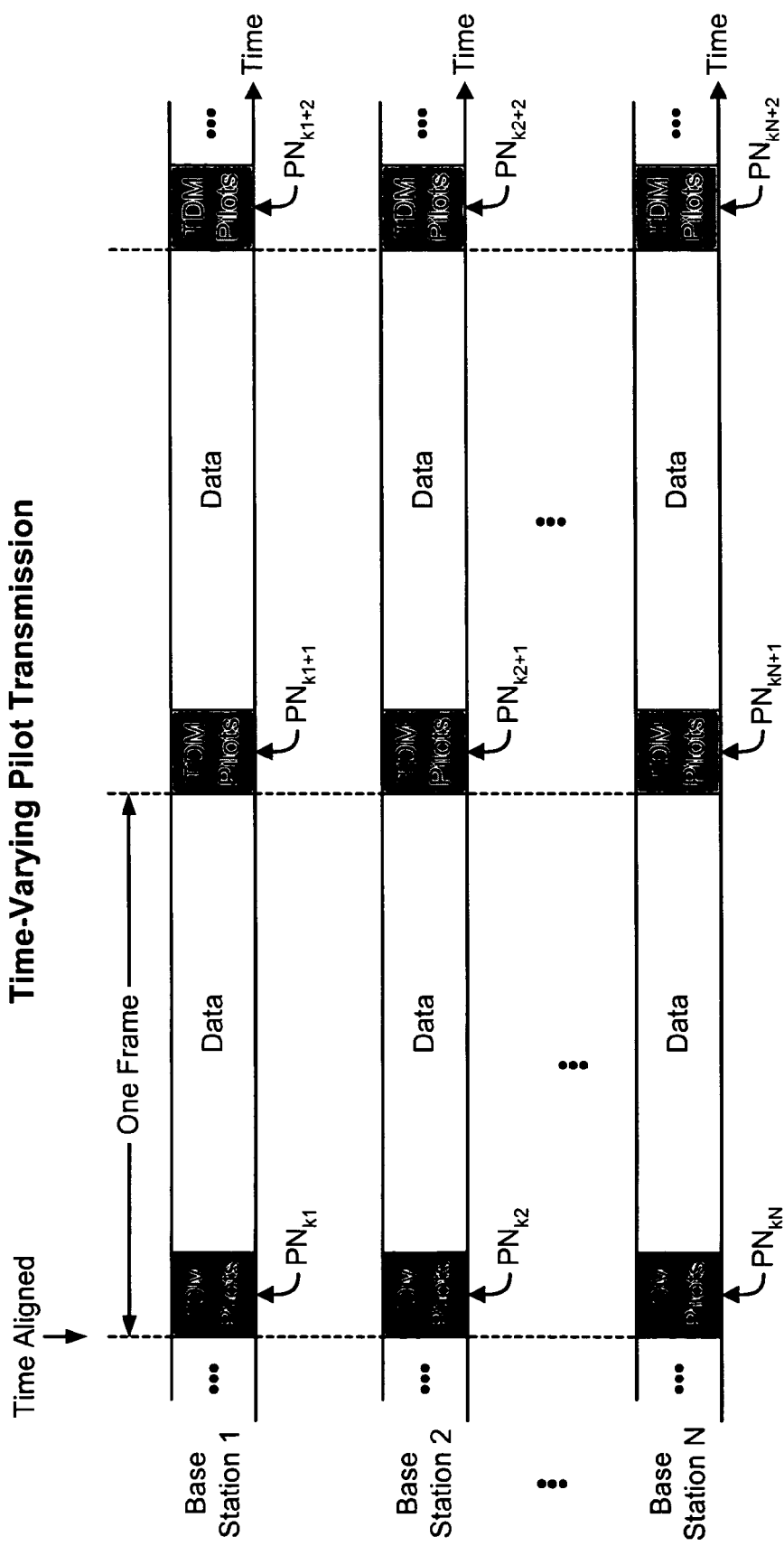
FIG. 3D shows time-varying pilot transmission on the forward link.

FIG. 3D shows a time-varying pilot transmission scheme for the forward link. For this scheme, each base station is assigned a set of $M_B$ PN1 sequences for TDM pilot1, where $M_B>1$. Each base station uses one PN1 sequence for TDM pilot1 for each frame and cycles through the $M_B$ PN1 sequences in $M_B$ frames. Different base stations are assigned different sets of $M_B$ PN1 sequences.

The set of $M_B$ PN1 sequences for each base station may be viewed as a "long code" that spans across multiple frames. Each of the $M_B$ PN1 sequences may be considered as a segment of the long code and may be generated with a different seed for the long code. To reduce receiver processing complexity, the same long code may be used for all base stations, and each base station may be assigned a different offset of the long code. For example, base station i may be assigned a long code offset of ki, where ki is within a range of 0 through $M_B-1$. The PN1 sequences for base station i, starting at a designated frame, is then given as: $PN1_{ki+1}, PN1_{ki+1}, PN1_{ki+2}$, and so on. Detection of a given PN1 sequence or long code offset, along with the frame in which the PN1 sequence is detected relative to the designated frame, can identify which set of PN1 sequences the detected PN1 sequence belongs.

In general, improved acquisition performance may be achieved if all base stations in the system are synchronized and transmit their TDM pilots at the same time. However, this is not a necessary condition, and all or a subset of the base stations in the system may be asynchronous. For clarity, much of the following description assumes that the base stations are synchronous.

FIGS. 2A and 2B show the use of two TDM pilots, or TDM pilots1 and2. In general, any number of TDM pilots may be used to facilitate signal acquisition by the terminals. Each TDM pilot may be associated with a different set of PN sequences. A hierarchical structure may be used for the PN sequences. For example, TDM pilot1 may be associated with $M_1$ possible PN1 sequences (or $M_1$ possible sets of PN1 sequences), each PN1 sequence may be associated with $M_2$ possible PN2 sequences, each PN2 sequence may be associated with $M_3$ possible PN3 sequences, and so on. Each PN1 sequence may be assigned to a large number of base stations in the system, each PN2 sequence may be assigned to a smaller number of base stations, and so on. In general, each TDM pilot may be generated with a PN sequence or without a PN sequence. For simplicity, the following description assumes the use of two TDM pilots generated with two PN sequences selected from two different sets of PN sequences.

The terminal performs different processing for signal detection and time synchronization. The use of different PN sequences for TDM pilots1 and2 allows the terminal to split up the processing for these two tasks, as described below.

1. Delayed Correlation for TDM pilot1

At a terminal, the received sample for each sample period may be expressed as:

$$r(n)=h(n)\otimes s(n)+w(n)=y(n)+w(n), \quad \text{Eq (1)}$$

where n is an index for sample period;
s(n) is a time-domain sample sent by a base station in sample period n;
h(n) is a complex channel gain observed by sample s(n);
r(n) is a received sample obtained by the terminal for sample period n;
w(n) is the noise for sample period n;
y(n)=h(n⊗s(n); and
⊗denotes a convolution operation.

TDM pilot1 is a periodic signal composed of $S_1$ instances of the pilot-1 sequence. The terminal may perform delayed correlation to detect for the presence of an underlying periodic signal (e.g., TDM pilot 1) in the received signal. The delayed correlation may be expressed as:

$$C(n) = \sum_{i=0}^{N_1-1} r^*(n-i) \cdot r(n-i-L_1), \quad \text{Eq (2)}$$

where C(n) is a delayed correlation result for sample period n;
$N_1$ is the length or duration of the delayed correlation; and
"*" denotes a complex conjugate.

The delayed correlation length ($N_1$) may be set to the total length of TDM pilot1 ($T_1$) minus the length of one pilot-1 sequence ($L_1$) and minus a margin ($Q_1$) to account for ISI effects at the edges of TDM pilot1, or $N_1=T_1-L_1-Q_1$. For the embodiment shown in FIGS. 2A and 2B with TDM pilot1 comprising two pilot-1 sequences, the delayed correlation length $N_1$ may be set to pilot-1 sequence length, or $N_1=L_1$.

Equation (2) computes a correlation between two received samples $r(n-i)$ and $r(n-i-L_1)$ that are spaced apart by $L_1$ sample periods, which is the pilot-1 sequence length. This correlation, which is $c(n-i)=r^*(n-i) \cdot r(n-i-L_1)$, removes the effect of the communication channel without requiring a channel gain estimate. $N_1$ correlations are computed for $N_1$ different pairs of received samples. Equation (2) then accumulates the $N_1$ correlation results $c(n)$ through $c(n-N_1+1)$ to obtain the delayed correlation result C(n), which is a complex value.

A delayed correlation metric may be defined as the squared magnitude of the delayed correlation result, as follows:

$$S(n)=|C(n)|^2, \quad \text{Eq (3)}$$

where $|x|^2$ denotes the squared magnitude of x.

The terminal may declare the presence of TDM pilot1 if the following condition is true:

$$S(n)>\lambda \cdot |E_{rx}|^2, \quad \text{Eq (4)}$$

where $E_{rx}$ is the energy of the received samples and $\lambda$ is a threshold value. The energy $E_{rx}$ may be computed based on the received samples used for the delayed correlation and is indicative of the temporally local energy. Equation (4) performs a normalized comparison, where the normalization is based on the energy of the received samples for TDM pilot1, if it is present. The threshold value $\lambda$ may be selected to trade off between detection probability and false alarm probability for TDM pilot1. Detection probability is the probability of correctly indicating the presence of TDM pilot1 when it is present. False alarm probability is the probability of incorrectly indicating the presence of TDM Pilot1 when it is not present. High detection probability and low false alarm probability are desirable. In general, a higher threshold value reduces both detection probability and false alarm probability.

Equation (4) shows the use of an energy-based threshold to detect for TDM Pilot1. Other thresholding schemes may also be used for TDM pilot detection. For example, if an automatic gain control (AGC) mechanism automatically normalizes the energy of the received samples, then an absolute threshold may be used for TDM pilot detection.

If the terminal is equipped with multiple (R) antennas, then the delayed correlation result $C_j(n)$ may be computed for each antenna j as shown in equation (2). The delayed correlation results for all antennas may be coherently combined as follows:

$$C_{total}(n) = \sum_{j=1}^{R} C_j(n). \quad \text{Eq (5)}$$

The squared magnitude of the combined delayed correlation result, or $|C_{total}(n)|^2$, may be compared against a normalized threshold $$\lambda \cdot \sum_{j=1}^{R} E_j^2,$$

where $E_j$ is the received energy for antenna j.

The terminal computes an $N_1$-point delayed correlation C(n) for each sample period n based on the received sample sequence $\{r(n-i)\}$ and the delayed received sample sequence $\{r(n-i-L_1)\}$, as shown in equation (2). If $S_1=2$, then the magnitude of the delayed correlation has a triangular shape when plotted against sample period n. The delayed correlation result has a peak value at sample period $n_p$. This peak occurs when the delayed correlation spans the duration of the two pilot-1 sequences. If the delayed correlation is performed as described above and in the absence of noise, then sample period $n_p$ is "close to" the end of the second pilot-1 sequence for TDM pilot1. The imprecision in the peak location is due to ISI effects at the edges of TDM pilot1. The magnitude of the delayed correlation result falls off gradually on both sides of sample period $n_p$, since the signal is periodic over only a portion of the delayed correlation duration for all other sample periods.

The terminal declares the presence of TDM pilot1 if the delayed correlation metric S(n) crosses the predetermined threshold in any sample period, as shown in equation (4). This sample period occurs on the left or leading edge of the triangular shape. The terminal continues to perform the delayed correlation (e.g., for the next $L_1$ sample periods) in order to detect for the peak in the delayed correlation result. If TDM pilot1 has been detected, then the location of the delayed correlation peak is used as a coarse time estimate. This time estimate may not be very accurate because (1) the delayed correlation result has a gradual peak and the location of the peak may be inaccurate in the presence of noise and (2) ISI at the edges of the TDM pilot1 causes degradation in the delayed correlation result.

In an alternative embodiment, the delayed correlation is performed across an entire frame to obtain a delayed correlation metric for each sample period in the frame. The largest delayed correlation metric in the frame is then provided as the location of the detected TDM pilot1 and the coarse time estimate. This embodiment performs TDM pilot1 detection without the use of a threshold and may also reduce false peak detection due to interference from, e.g., a frequency division multiplexed (FDM) pilot that is transmitted continuously across the data portion of each frame by neighboring base stations and/or the base station being detected. Other schemes (which may employ more sophisticated detection logic) may also be used to detect for the presence of TDM pilot1 and to determine the location of the delayed correlation peak.

The delayed correlation is essentially used to detect for the presence of an underlying periodic signal. The delayed correlation is thus immune to multipath degradations but still captures multipath diversity. This is because a periodic signal remains periodic in the presence of multipath. Furthermore, if multiple base stations transmit periodic signals simultaneously, then the composite signal at the terminal is also periodic. For synchronous pilot transmission as shown in FIG. 3A, TDM pilot1 essentially observes no interference (for the purpose of delayed correlation) and is affected mainly by thermal noise. As a result, the signal-to-noise ratio (SNR) or carrier-to-interference ratio (C/I) for TDM pilot1 may be higher than the SNR for other transmissions. The higher SNR for TDM pilot1 allows the terminal to achieve good detection performance with a shorter TDM pilot1 duration, which reduces overhead.

The terminal may obtain a coarse frequency error estimate based on the delayed correlation result C(n). If the frequency of a radio frequency (RF) oscillator used for frequency downconversion at the terminal is offset from the center frequency of the received signal, then the received samples have a phase ramp in the time domain and may be expressed as:

$$r(n)=y(n)\cdot e^{j2\pi\cdot\Delta f\cdot T_c\cdot n}+w(n),\qquad \text{Eq (6)}$$

where $\Delta f$ is the frequency offset/error and $T_c$ is one chip period. Equation (6) differs from equation (1) by the phase ramp $e^{j2\pi\cdot\Delta f\cdot T_c\cdot n}$ caused by frequency error $\Delta f$ in the RF oscillator at the terminal.

If the expression for the received samples in equation (6) is used for the delayed correlation in equation (2), then the phase of the delayed correlation result (assuming no noise) may be expressed as:

$$2\pi\cdot\Delta f\cdot L_1\cdot T_c=\arg\{C(n)\},\qquad \text{Eq (7)}$$

where arg $\{x\}$ is the argument of x, which is the arctangent of the imaginary part of x over the real part of x. The frequency error $\Delta f$ may be obtained by dividing the phase of the delayed correlation result by $2\pi\cdot L_1\cdot T_c$, as follows:

$$\Delta f = \frac{\arg\{C(n)\}}{2\pi\cdot L_1\cdot T_c}.\qquad \text{Eq (8)}$$

The frequency error estimate in equation (8) is valid if the phase of the delayed correlation result is within a range of $-\pi$ to $\pi$, or $2\pi\cdot\Delta f\cdot L_1\cdot T_c\in(-\pi,\pi)$. A frequency error that is too large cannot be detected by the delayed correlation. Thus, the frequency error should be maintained less than a maximum allowable range. For example, $|\Delta f|$ should be less than 9.75 KHz or 4.65 parts per million (ppm) if the center frequency is 2.1 GHz. For a conservative design, the frequency error may be constrained to an even smaller range, e.g., $|\Delta f|<2.5$ ppm. A larger frequency error may be tolerated and detected by reducing the length of pilot-1 sequence. However, a shorter pilot-1 sequence also degrades signal detection performance.

The frequency error $\Delta f$ may be corrected in various manners. For example, the frequency of the RF oscillator at the terminal may be adjusted via a phase-locked loop (PLL) to correct for the frequency error. As another example, the received samples may be digitally rotated as follows:

$$r'(n)=r(n)\cdot e^{-j2\pi\cdot\Delta f\cdot T_c\cdot n},\qquad \text{Eq (9)}$$

where r'(n) is a frequency-corrected sample. The terminal may also perform resampling of the frequency-corrected samples to account for frequency error of the clock used for sampling, which may be generated from the same RF oscillator.

2. Direct Correlation for TDM Pilot1

The peak of the delayed correlation gives an approximate location of TDM Pilot1. The actual location of TDM pilot1 falls within an uncertainty window (denoted as $W_u$) that is centered at the location $n_p$ of the delayed correlation peak. Computer simulations for an exemplary system indicate that there is a high likelihood of TDM pilot1 falling within ±35 sample periods of the peak location $n_p$ when a single base station is transmitting. When multiple base stations are transmitting in a synchronous system, the uncertainty window depends on the lag or delay between the arrival times of the signals transmitted by these base stations. This lag is dependent on the distance between the base stations. As an example, a distance of 5 kilo meter (km) corresponds to a lag of approximately 80 sample periods, and the uncertainty window is about ±80 sample periods. In general, the uncertainty window is dependent on various factors such as the system bandwidth, the TDM pilot1 duration, the received SNR for TDM pilot1, the number of base stations transmitting TDM pilot1, the time delay for different base stations, and so on.

The terminal may perform direct correlation to detect for strong instances of TDM pilot1 within the uncertainty window. For each time offset within the uncertainty window, the terminal may perform direct correlation for each of the $M_1$ possible PN1 sequences that may be used for TDM pilot1. Alternatively, the terminal may perform direct correlation for each PN1 sequence used by a base station in a candidate set for the terminal. This candidate set may contain base stations (e.g., sectors) identified by the base stations with which the terminal is in communication, base stations that the terminal has identified itself via a low-rate search, and so on. In any case, each pilot-1 hypothesis corresponds to (1) a specific time offset where TDM pilot1 from a base station may be present and (2) a specific PN1 sequence that may have been used for the TDM pilot1.

The direct correlation for TDM pilot1 for pilot-1 hypothesis (n,m), with time offset of n and PN1 sequence of $p_m(i)$, may be expressed as:

$$D_m(n) = \sum_{i=0}^{N_{1,d}-1} r^*(i-n)\cdot p'_m(i),\qquad \text{Eq (10)}$$

where n is the time offset for pilot-1 hypothesis (n,m), which falls within the uncertainty window, or $n\in W_u$;

$p'_m(i)$ is the i-th chip in an extended PN1 sequence for pilot-1 hypothesis (n,m);

$D_m(n)$ is a direct correlation result for pilot-1 hypothesis (n,m); and $N_{1d}$ is the length of the direct correlation for TDM pilot1 (e.g., $N_{1d}=S_1 \cdot L_1$).

The extended PN1 sequence $p'_m(i)$ is obtained by repeating the PN1 sequence $p_m(i)$ for pilot-1 hypothesis (n,m) as many times as needed to obtain $N_{1d}$ PN chips. For example, if the direct correlation is performed over two pilot-1 instances, or $N_{1d}=2 \cdot L_1$, then the PN1 sequence $p_m(i)$ of length $L_1$ is repeated twice to obtain the extended PN1 sequence $p'_m(i)$ of length $2L_1$.

For each PN1 sequence to be evaluated, the terminal may perform direct correlation at every half chip within the uncertainty window in order to reduce degradation due to sample timing error at the terminal. For example, if the uncertainty window is ±80 chips, then the terminal may perform 320 direct correlations for each PN1 sequence, which corresponds to an uncertainty of 80 sample periods in each direction from the uncertainty window center at sample period $n_p$. If all $M_1$ PN1 sequences are evaluated, then the total number of direct correlations for TDM pilot1 is $320 \cdot M_1$. In general, the terminal performs $K_1$ direct correlations for $K_1$ different time offsets for each PN1 sequence to be evaluated, or $K_1 \cdot M_1$ direct correlations if all $M_1$ PN1 sequences are evaluated.

The direct correlation is used to identify strong instances of TDM pilot1 in the received signal. After performing all of the direct correlations for TDM pilot1, the terminal selects $K_2$ strongest TDM pilot1 instances having the largest direct correlation results. Each detected TDM pilot1 instance is associated with a specific time offset and a specific PN1 sequence, e.g., the k-th detected TDM pilot1 instance is associated with time offset $n_k$ and PN1 sequence $p_k(i)$. The terminal may also compare the direct correlation metric for each detected TDM pilot1 instance against a normalized threshold and discard the instance if its metric is below the threshold. In any case, $K_2$ may be a small value for initial acquisition when the terminal is attempting to detect for the strongest base station. For handoff between base stations, $K_2$ may be a larger value to allow for detection of signal paths belonging to the strongest base station as well as weaker base stations. Computer simulations indicate that $K_2=4$ may be sufficient for initial acquisition and $K_2=16$ may be sufficient to detect for multiple base stations for handoff.

The direction correlation may also be performed in the frequency domain. For frequency domain direct correlation, an $N_F$-point discrete Fourier transform (DFT) is performed on $N_F$ received samples for a given time offset n to obtain $N_F$ frequency-domain values for the $N_F$ total subbands. The frequency-domain values for subbands without pilot symbols are set to zero. The resultant $N_F$ frequency-domain values are then multiplied with $N_F$ pilot symbols that include the PN1 sequence for a pilot-1 hypothesis being evaluated. The $N_F$ resultant symbols may be accumulated to obtain a direct correlation result for the pilot-1 hypothesis at time offset n. Alternatively, an $N_F$-point IDFT may be performed on the $N_F$ resultant symbols to obtain $N_F$ time-domain values, which corresponds to different time offsets. In any case, the correlation results may be post-processed as described above to identify the $K_2$ strongest TDM pilot1 instances.

3. Direct Correlation for TDM Pilot2

The terminal evaluates the $K_2$ detected TDM pilot1 instances by performing direct correlation on the received samples for TDM pilot2 with PN2 sequences. For each detected TDM pilot1 instance, the terminal determines the set of $M_2$ PN2 sequences $\{s_{l,k}(i)\}$ associated with the PN1 sequence $p_k(i)$ used for that detected TDM pilot1 instance. Each detected TDM pilot1 instance may thus be associated with $M_2$ pilot-2 hypotheses. Each pilot-2 hypothesis corresponds to (1) a specific time offset where TDM pilot2 from a base station may be present and (2) a specific PN2 sequence that may have been used for the TDM pilot2. For each pilot-2 hypothesis, the terminal performs direct correlation on the received samples for TDM pilot2 with the PN2 sequence for that hypothesis to detect for the presence of TDM pilot2.

The direct correlation for TDM pilot2 for pilot-2 hypothesis (k,l), with time offset of $n_k$ and PN2 sequence of $s_{l,k}(i)$, may be expressed as:

$$G_l(n_k) = \sum_{i=0}^{N_2-1} r^*(i-n_k) \cdot s_{l,k}(i), \qquad \text{Eq (11)}$$

where $s_{l,k}(i)$ is the i-th chip in the PN2 sequence for pilot-2 hypothesis (k,l);

$r(i-n_k)$ is the i-th received sample for time offset $n_k$;

$G_l(n_k)$ is a direct correlation result for pilot-2 hypothesis (k,l); and $N_2$ is the length of the direct correlation for TDM pilot2. The direct correlation length may be set to the length of the pilot-2 sequence (i.e., $N_2=L_2$) or the length of TDM pilot2 (i.e., $N_2=T_2$) if $T_2 \neq L_2$.

A direct correlation metric for TDM pilot2 may be defined as the squared magnitude of the direct correlation result, as follows:

$$H_l(n_k) = |G_l(n_k)|^2. \qquad \text{Eq (12)}$$

The terminal may declare the presence of TDM pilot2 if the following condition is true:

$$H_l(n_k) > \mu \cdot E_{rx}, \qquad \text{Eq (13)}$$

where $E_{rx}$ is the energy of the received samples and $\mu$ is a threshold value for TDM Pilot2. The energy $E_{rx}$ may be computed based on the received samples used for the direct correlation for TDM pilot2 and is indicative of the local energy. The threshold value $\mu$ may be selected to trade off between detection probability and false alarm probability for TDM pilot2.

If the terminal is equipped with multiple (R) antennas, then the direct correlation $G_{l,j}(n_k)$ may be computed for each antenna j for a given hypothesis (k,l), as shown in equation (11). The direct correlation results for all R antennas may be non-coherently combined as follows:

$$H_{total,l}(n_k) = \sum_{j=1}^{R} |G_{l,j}(n_k)|^2. \qquad \text{Eq (14)}$$

Equation (14) assumes that the path delay at all R antennas is the same, but the magnitudes of the channel gains for the R antennas are independent. The composite direct correlation metric $H_{total,l}(n_k)$ may be compared against a normalized threshold $\mu \cdot E_{rx\_total}$, where $E_{rx\_total}$ is the total energy for all R antennas.

The $\lambda$ and $\mu$ thresholds are used for detection of TDM pilots1 and2, respectively. These thresholds determine the detection probability as well as the false alarm probability. Low $\lambda$ and $\mu$ thresholds increase the detection probability but also increase false alarm probability, and the converse is true for high $\lambda$ and $\mu$ thresholds. For a given threshold, the detection probability and false alarm probability generally increase with increasing SNR. The $\lambda$ and $\mu$ thresholds may be appropriately selected such that (1) the detection rates for the delayed correlation and direct correlation, respectively, are sufficiently high even at low SNRs, and (2) the false alarm rates for the delayed correlation and direct correlation, respectively, are sufficiently low even at high SNRs.

A detection probability of $P_{det}$ corresponds to a misdetection probability of $(1-P_{det})$. A misdetection is not detecting a pilot that is present. A misdetection of TDM pilot1 has the effect of extending acquisition time, until the next transmission of TDM pilot1 is received. If TDM pilot1 is transmitted periodically (e.g., every 20 milliseconds), then a misdetection of TDM pilot1 is not problematic.

A false alarm for the delayed correlation for TDM pilot1 is not catastrophic since the subsequent direct correlation for TDM pilot2 will most likely catch this false alarm as a bad hypothesis, i.e., this hypothesis will most likely fail the normalized comparison in equation (13). An adverse effect of a delayed correlation false alarm is extra computation for the direct correlations for both TDM pilots1 and2. The number of delayed correlation false alarms should be kept small, e.g., to a given target delayed correlation false alarm probability for any one frame. A false alarm for the direct correlation for TDM pilot2 results in an increased false alarm probability for the overall system. The false alarm rate for TDM pilot2 may be reduced by performing direct correlation with only PN2 sequences used by the base station(s) in the candidate set. A large frequency error that exceeds a maximum allowable range is not corrected nor detected by the direct correlations for TDM pilots1 and pilot2, and hence has the same effect as a false alarm.

A mechanism may be used to recover from a false alarm event in the direct correlation for TDM pilot2. If the direct correlation for TDM pilot2 declares detection, then the terminal should be able to demodulate the data and control channels sent by the base station after the frequency and/or time tracking loops have converged. The terminal may check for a false alarm by attempting to decode a control channel. For example, each base station in the system may broadcast a control channel on the forward link to send assignment and acknowledgment to terminals within its coverage area. This control channel may be required to have a high (e.g., 99%) detection probability for satisfactory system operation and may utilize a strong error detection code, e.g., a 16 bit cyclic redundancy check (CRC), which corresponds to a false alarm probability of $0.5^{16} \approx 1.5 \times 10^{-5}$. When the direct correlation for TDM pilot2 declares detection, the terminal may attempt to decode one or more packets or messages sent on this control channel. If the decoding fails, then the terminal may declare a false alarm and restart the acquisition process.

Figure 4:
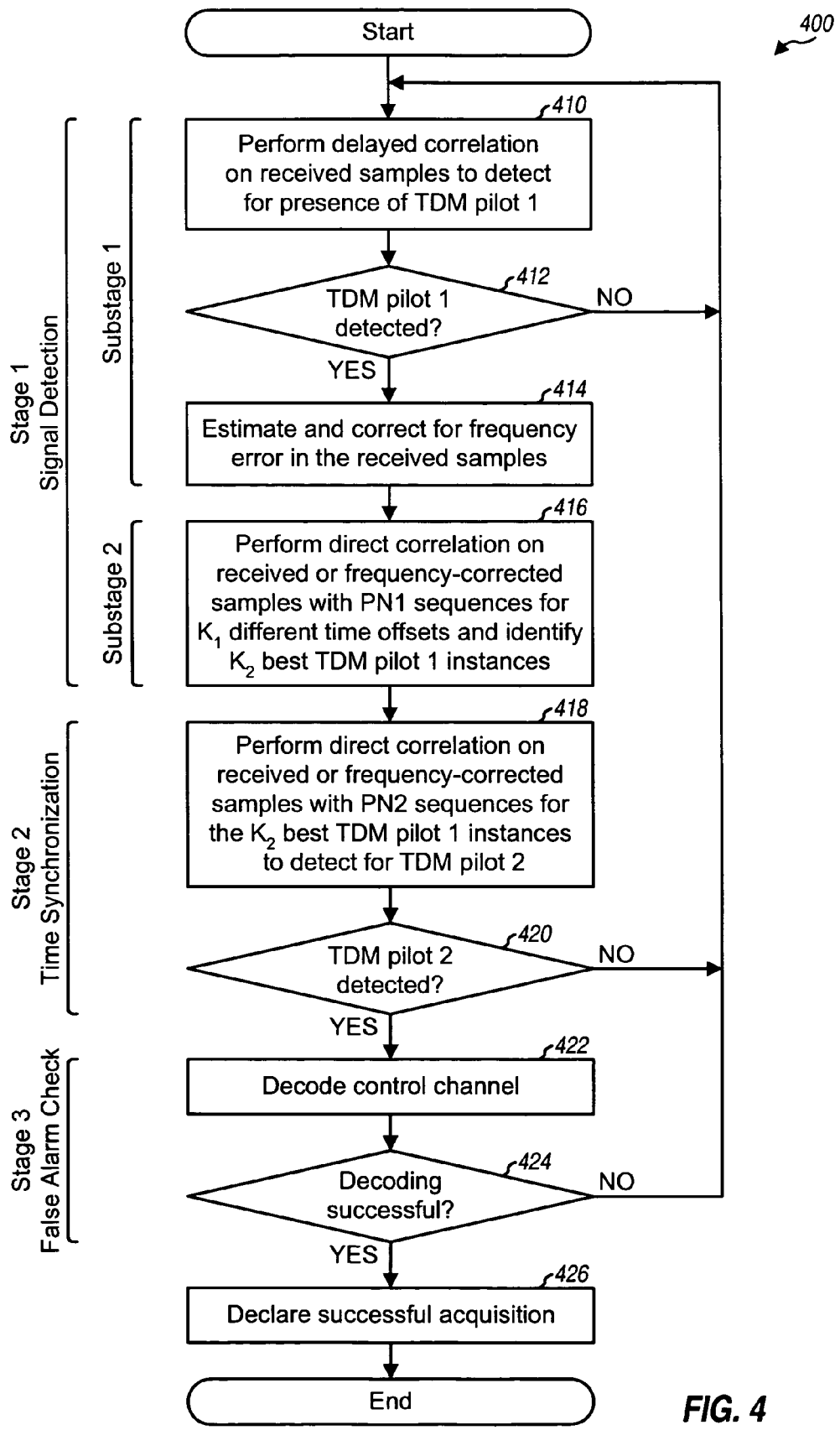
FIG. 4 shows a process performed by a terminal for signal acquisition.

FIG. 4 shows a flow diagram of an acquisition process 400 performed by the terminal. The terminal performs delayed correlation on the received samples to detect for the presence of TDM pilot1 (block 410). This may be achieved by performing delayed correlation for each sample period and comparing the delayed correlation metric $S(n)$ against the normalized threshold. If TDM pilot1 is not detected, as determined in block 412, then the terminal returns to block 410 to perform delayed correlation in the next sample period. However, if TDM pilot1 is detected, then the terminal estimates the frequency error in the received sample and corrects for the frequency error (block 414).

The terminal then performs direct correlation on either the received samples or the frequency-corrected samples with PN1 sequences for $K_1$ different time offsets and identifies $K_2$ best detected TDM pilot1 instances having $K_2$ largest direct correlation results for TDM pilot1 (block 416). Each detected TDM pilot1 instance is associated with a specific time offset and a specific PN1 sequence. The terminal may evaluate $M_2$ pilot-2 hypotheses for each detected TDM pilot1 instance, with each pilot-2 hypothesis being associated with a specific time offset and a specific PN2 sequence. For each pilot-2 hypothesis, the terminal performs direct correlation on the received or frequency-corrected samples with the PN2 sequence for the hypothesis and compares the direct correlation metric $H_i(n_k)$ against the normalized threshold to detect for the presence of TDM pilot2 (block 418).

If TDM pilot2 is not detected, as determined in block 420, then the terminal returns to block 410. Otherwise, the terminal may attempt to decode a control channel to check for false alarm (block 422). If the control channel is successfully decoded, as determined in block 424, then the terminal declares successful acquisition (block 426). Otherwise, the terminal returns to block 410.

The acquisition process may be performed in stages, as shown in FIG. 4. Stage 1 covers the delayed and direct correlations for TDM pilot1 and is generally used for signal detection. Stage 1 includes substage 1 for the delayed correlation for TDM pilot1 and substage 2 for the direct correlation for TDM pilot1. Stage 2 covers the direct correlation for TDM pilot2 and is used for time synchronization and base station identification. Stage 3 covers the decoding of a control channel and is used to check for false alarm. Signal acquisition may also be performed with fewer than all of the stages and substages shown in FIG. 4. For example, stage 3 may be omitted, substage 2 may be omitted, and so on.

The terminal performs initial acquisition (e.g., upon power up) if it is not already receiving a signal from a base station. The terminal typically does not have accurate system timing for initial acquisition and may thus perform direct correlation for TDM pilot1 over a larger uncertainty window in order to ensure detection of TDM pilot1. For initial acquisition, the terminal may only need to search for the strongest base station, and may thus select a smaller number of detected TDM pilot1 instances for subsequent evaluation.

The terminal may perform handoff acquisition to search for better (e.g., stronger) base stations to receive service from. For the staggered pilot transmission scheme shown in FIG. 3B or the asynchronous pilot transmission scheme shown in FIG. 3C, the terminal may continually search for strong base stations by performing delayed correlation as a background task while the terminal is communicating with one or more base stations in an active set. The delayed correlation provides coarse timing for the strong base stations found by the search. For the synchronous pilot transmission scheme shown in FIG. 3A, the timing of the base stations in the active set may be used as the coarse timing of other strong base stations. In any case, the terminal may perform direct correlation for TDM pilot2 for all new base stations with sufficiently high received signal strength. Since the terminal already has accurate system timing from the base station(s) in the active set, the terminal does not need to use the coarse time estimate from the delayed correlation and may perform direct correlation over an uncertainty window centered at the timing of the base station(s) in the active set. The terminal may initiate a handoff to another base station having stronger received signal strength than that of the base station(s) in the active set.

For clarity, a specific pilot transmission scheme with two TDM pilots has been described above. The use of two TDM pilots may reduce computation at the terminal since signal acquisition may be performed in two parts—the signal detection and time synchronization. The delayed correlation for signal detection may be efficiently performed with just one multiply for each sample period, as described below. Each direct correlation requires multiple ($N_{1d}$ or $N_2$) multiplies. The number of direct correlations to compute is dependent on the number of PN sequences to be evaluated and may be large (e.g., $K_1 \cdot M_1$ direct correlations for TDM pilot1, and $K_2 \cdot M_2$ direct correlations for TDM pilot2). The pre-processing with TDM pilot1 can greatly reduce the amount of processing required for TDM pilot2.

$M_1$ PN1 sequences may be used for TDM pilot1, and $M_2$ PN2 sequences may be used for TDM pilot2 for each PN1 sequence, which gives a total of $M_1 \cdot M_2$ PN2 sequences. The choice of $M_1$ and $M_2$ affects the complexity of acquisition and the false alarm probability, but has little or no effect on the detection probabilities for the delayed correlation and direct correlation (for the same threshold values). As an example, if $K_1$=320 direct correlations are performed for each PN1 sequence (e.g., for a lag of 80 chips) and $K_2$=16 direct correlations are performed for each PN2 sequence (e.g., for handoff acquisition), then the total number of direct correlations is $K_1 \cdot M_1 + K_2 \cdot M_2 = 320 \cdot M_1 + 16 \cdot M_2$. If $M_1 \cdot M_2$=256 PN2 sequences are needed for the system, then computation is minimized if $M_1$=4 and $M_2$=64, and the number of direct correlations is 2304. In general, any values may be chosen for $M_1$ and $M_2$ depending on various factors such as, e.g., the total number of PN2 sequences required by the system, the uncertainty window size (or $K_1$), the number of detected TDM pilot 1 instances to evaluate ($K_2$), and so on. Complexity may also be reduced by searching for pilots with PN sequences used by base station(s) in the candidate set.

The TDM pilots may also carry data. For example, TDM pilot2 may be used to send one or more bits of information, which may be embedded in the PN2 sequence used by each base station. Instead of having $M_1 \cdot M_2$ PN2 sequences for TDM pilot2, one bit of information may be conveyed by using $2 \cdot M_1 \cdot M_2$ PN2 sequences for TDM pilot2. Each base station may then be assigned a pair of PN2 sequences and may use one PN2 sequence in the pair to convey an information bit value of '0' and use the other PN2 sequence in the pair to convey an information bit value of '1'. The number of hypothesis to evaluate for acquisition doubles because there is twice the number of possible PN2 sequences. After acquisition, the PN2 sequence is known and the associated information bit value can be ascertained. More information bits may be conveyed by using a larger set of PN2 sequences for each base station. If the data modulation consists of multiplying the PN2 sequence by a phase factor, then no additional correlations are required. This is because only at the magnitude of the correlation is examined and the phase is ignored.

Signal acquisition may also be performed with a single TDM pilot. For example, each base station may transmit a TDM pilot using a PN sequence that uniquely identifies that base station. The terminal receives the TDM pilots from all base stations and performs delayed correlation on the received samples for signal detection. If a signal is detected, then the terminal may perform direct correlation on the received samples for the TDM pilot with all of the PN sequences and at different time offsets (or $K_1 \cdot M_1 \cdot M_2$ direct correlations, which may be much larger than $K_1 \cdot M_1 + K_2 \cdot M_2$). From the direct correlation results, the terminal can identify each base station transmitting the TDM pilot and determine its timing. Alternatively, the terminal may perform direct correlation on the received samples for the TDM pilot with a limited set of PN sequences (e.g., for base stations in the candidate set) to reduce complexity.

In addition to the TDM pilot(s), each base station in an OFDM-based system may transmit a frequency division multiplexed (FDM) pilot on one or more pilot subbands, which are subbands designated for the FDM pilot. Each base station may transmit the FDM pilot in data field 230 in FIG. 2A and may apply a unique PN sequence on the pilot symbols sent on the pilot subband(s). The first PN chip in this PN sequence may be used for the FDM pilot in symbol period 1, the second PN chip may be used for the FDM pilot in symbol period 2, and so on. The PN sequence used for the FDM pilot may be the same as, or different from, the PN2 sequence used for TDM pilot 2. The FDM pilot may be used to improve acquisition performance, e.g., to reduce false alarm rate. The FDM pilot may also be used to uniquely identify the base stations in the system. For example, a smaller number of PN2 sequences may be used for TDM pilot 2, and the FDM pilot may be used to resolve any ambiguity among base stations.

The direct correlations for TDM pilots1 and2 compute the received signal strength at specific time offsets. The base stations are thus identified based on their strongest signal paths, where each signal path is associated with a particular time offset. A receiver in an OFDM-based system can capture the energy for all signal paths within the cyclic prefix. Thus, base stations may be selected based on a total energy metric instead of a strongest path metric.

For a synchronous system, the base stations may transmit their TDM pilots1 And2 at the same time, as shown in FIG. 3A. Alternatively, the base stations may transmit their TDM pilots staggered in time, as shown in FIG. 3B. For staggered TDM pilots, the terminal may obtain delayed correlation peaks at different time offsets and may compare these peaks in order to select the strongest base station.

Some or all of the base stations in the system may be asynchronous. In this case, the TDM pilots from different base stations may not arrive coincidentally with each other. The terminal may still be able to perform the signal acquisition described above to search for and acquire pilots from the base station. However, if the base stations are asynchronous, then the TDM pilot1 from each base station may observe interference from other base stations, and detection performance for the delayed correlation degrades because of the interference. The duration of the TDM pilot1 may be extended to account for the interference and achieve the desired detection performance (e.g., the desired detection probability for TDM pilot1).

4. System

Figure 5:
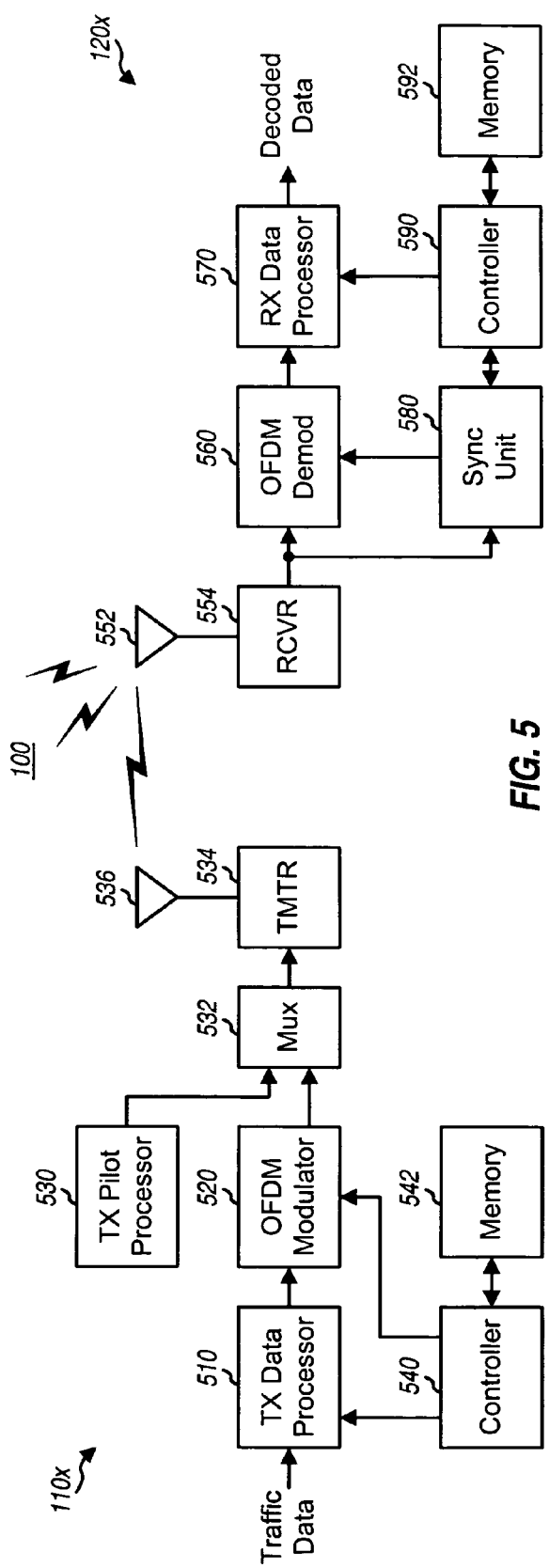
FIG. 5 shows a block diagram of a base station and a terminal.

FIG. 5 shows a block diagram of a base station 110x and a terminal 120x, which are one base station and one terminal in system 100. At base station 110x, a TX data processor 510 receives different types of data (e.g., traffic/packet data and overhead/control data) and processes (e.g., encodes, interleaves, and symbol maps) the received data to generate data symbols. As used herein, a "data symbol" is a modulation symbol for data, a "pilot symbol" is a modulation symbol for pilot (which is data that is known a priori by both the base station and terminals), and a modulation symbol is a complex value for a point in a signal constellation for a modulation scheme (e.g., M-PSK, M-QAM, and so on).

An OFDM modulator 520 multiplexes the data symbols onto the proper subbands and performs OFDM modulation on the multiplexed symbols to generate OFDM symbols. A TX pilot processor 530 generates TDM pilots1 and2 in the time domain (as shown in FIG. 5) or the frequency domain. A multiplexer (Mux) 532 receives and multiplexes TDM pilots1 and2 from TX pilot processor 530 with the OFDM symbols from OFDM modulator 520 and provides a stream of samples to a transmitter unit (TMTR) 534. Transmitter unit 534 converts the sample stream into analog signals and further conditions (e.g., amplifies, filters, and frequency upconverts) the analog signals to generate a modulated signal. Base station 110x then transmits the modulated signal from an antenna 536 to terminals in the system.

At terminal 120x, the transmitted signals from base station 110x as well as other base stations are received by an antenna 552 and provided to a receiver unit (RCVR) 554. Receiver unit 554 conditions (e.g., filters, amplifies, frequency downconverts, and digitizes) the received signal to generate a stream of received samples. A synchronization (sync) unit 580 obtains the received samples from receiver unit 554 and performs acquisition to detect for signals from the base stations and determine the timing of each detected base station. Unit 580 provides timing information to an OFDM demodulator 560 and/or a controller 590.

OFDM demodulator 560 performs OFDM demodulation on the received samples based on the timing information from unit 580 and obtains received data and pilot symbols. OFDM demodulator 560 also performs detection (or matched filtering) on the received data symbols with a channel estimate (e.g., a frequency response estimate) and obtains detected data symbols, which are estimates of the data symbols sent by base station 110x. OFDM demodulator 560 provides the detected data symbols to a receive (RX) data processor 570. RX data processor 570 processes (e.g., symbol demaps, deinterleaves, and decodes) the detected data symbols and provides decoded data. RX data processor 570 and/or controller 590 may use the timing information to recover different types of data sent by base station 110x. In general, the processing by OFDM demodulator 560 and RX data processor 570 is complementary to the processing by OFDM modulator 520 and TX data processor 510, respectively, at base station 110x.

Controllers 540 and 590 direct operation at base station 110x and terminal 120x, respectively. Memory units 542 and 592 provide storage for program codes and data used by controllers 540 and 590, respectively.

Figure 6:
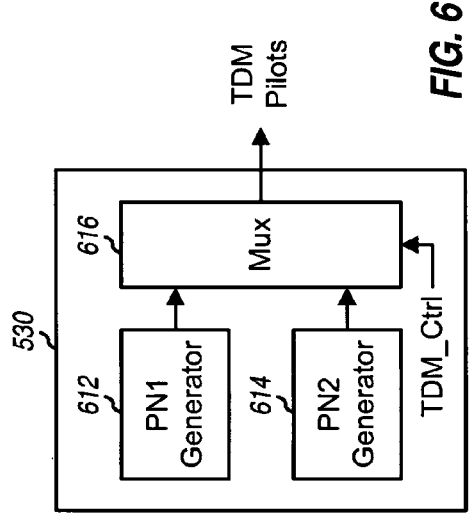
FIG. 6 shows a transmit (TX) pilot processor at the base station.

FIG. 6 shows a block diagram of an embodiment of TX pilot processor 530 at base station 110x. For this embodiment, TX pilot processor 530 generates TDM pilots1 and2 in the time domain. Within TX pilot processor 530, a PN1 generator 612 generates the PN1 sequence assigned to base station 110x, and a PN2 generator 614 generates the PN2 sequence assigned to base station 110x. Each PN generator may be implemented with, for example, a linear feedback shift register (LFSR) that implements a generator polynomial for the PN sequence. PN generators 612 and 614 may be initialized with the proper values corresponding to the PN1 and PN 2 sequences assigned to base station 110x. A multiplexer 616 receives the outputs from PN generators 612 and 614 and provides the output from each PN generator at the appropriate time, as determined by a TDM_Ctrl signal.

The TDM pilots may also be generated in the frequency domain, as described above. In this case, the PN1 and PN2 sequences from PN generators 612 and 614, respectively, may be provided to OFDM modulator 520 and used to multiply the frequency-domain pilot symbols or the time-domain samples for the TDM pilots.

Figure 7:
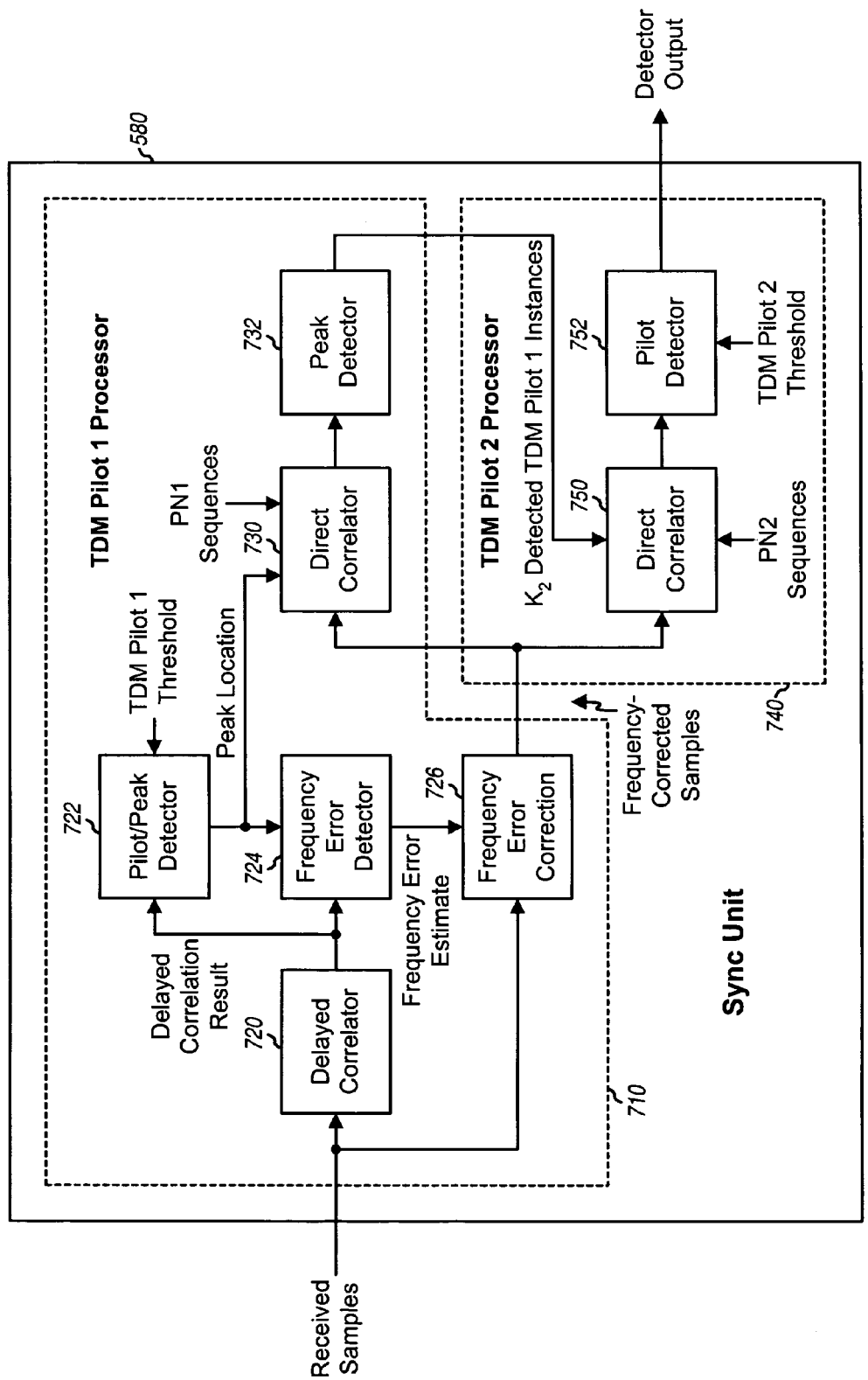
FIG. 7 shows a sync unit at the terminal.

FIG. 7 shows a block diagram of an embodiment of sync unit 580 at terminal 120x. Sync unit 580 includes a TDM pilot1 processor 710 and a TDM pilot2 processor 740. Within TDM pilot1 processor 710, a delayed correlator 720 performs delayed correlation on the received samples and provides a delayed correlation result $C(n)$ for each sample period. A pilot/peak detector 722 detects for the presence of TDM pilot1 in the received signal based on the delayed correlation results and, if a signal is detected, determines the peak of the delayed correlation. A frequency error detector 724 estimates the frequency error in the received samples based on the phase of the delayed correlation result at the detected peak, as shown in equation (8), and provides the frequency error estimate. A frequency error correction unit 726 performs frequency error correction on the received samples and provides frequency-corrected samples. A direct correlator 730 performs direct correlation on the frequency-corrected samples (as shown in FIG. 7) or the received samples (not shown) for different time offsets in the uncertainty window, which is centered at the detected peak location, and provides direct correlation results for TDM pilot1. A peak detector 732 detects for the $K_2$ strongest instances of TDM pilot1 within the uncertainty window.

Within TDM pilot2 processor 740, a direct correlator 750 performs direct correlation on the received or frequency corrected samples for different pilot-2 hypotheses determined by the $K_2$ strongest detected TDM pilot1 instances from peak detector 732 and provides direct correlation results for these pilot-2 hypotheses. A pilot detector 752 detects for presence of TDM pilot2 by performing the normalized comparison shown in equation (13). Pilot detector 752 provides the identity as well as the timing of each detected base station as the detector output.

Figure 8A:
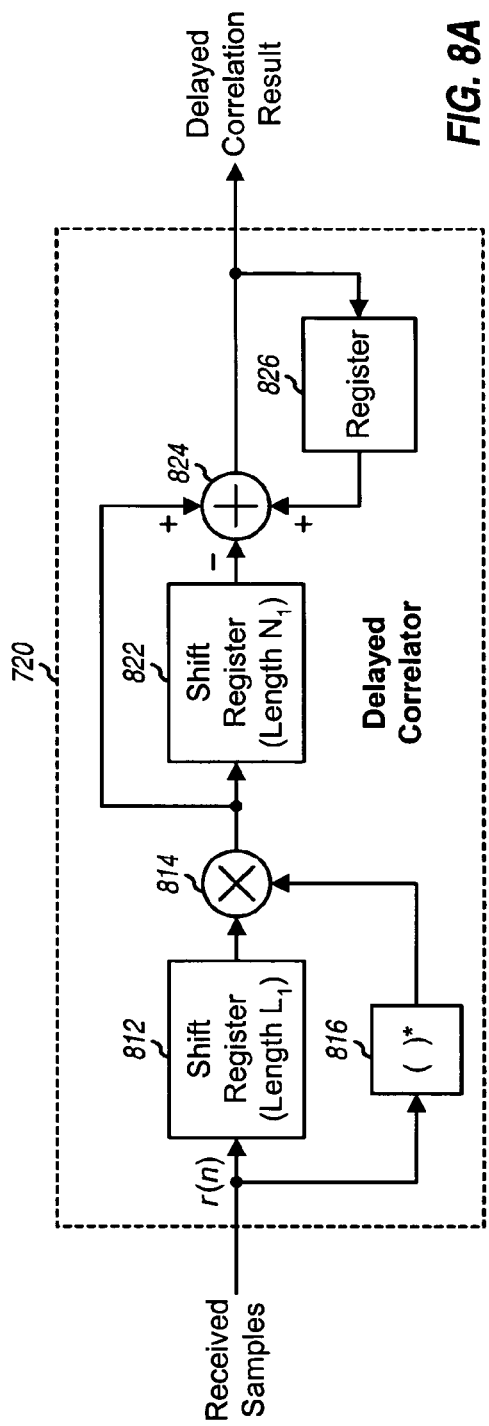
FIG. 8A shows a delayed correlator for TDM pilot1.

FIG. 8A shows a block diagram of an embodiment of delayed correlator 720 for TDM pilot1. Within delayed correlator 720, a shift register 812 (of length $L_1$) receives and stores the received sample $r(n)$ for each sample period n and provides a delayed received sample $r(n-L_1)$, which has been delayed by $L_1$ sample periods. A sample buffer may also be used in place of shift register 812. A unit 816 also obtains the received sample $r(n)$ and provides a complex-conjugated received sample $r^*(n)$. For each sample period n, a multiplier 814 multiplies the delayed received sample $r(n-L_1)$ from shift register 812 with the complex-conjugated received sample $r^*(n)$ from unit 816 and provides a correlation result $c(n)=r^*(n) \cdot r(n-L_1)$ to a shift register 822 (of length $N_1$) and a summer 824. For each sample period n, shift register 822 receives and stores the correlation result $c(n)$ from multiplier 814 and provides a correlation result $c(n-N_1)$ that has been delayed by $N_1$ sample periods. For each sample period n, summer 824 receives and sums the output $C(n-1)$ of a register 826 with the result $c(n)$ from multiplier 814, further subtracts the delayed result $c(n-N_1)$ from shift register 822, and provides its output $C(n)$ to register 826. Summer 824 and register 826 form an accumulator that performs the summation operation in equation (2). Shift register 822 and summer 824 are also configured to perform a running or sliding summation of the $N_1$ most recent correlation results $c(n)$ through $c(n-N_1+1)$. This is achieved by summing the most recent correlation result $c(n)$ from multiplier 814 and subtracting out the correlation result $c(n-N_1)$ from $N_1$ sample periods earlier, which is provided by shift register 822.

Figure 8B:
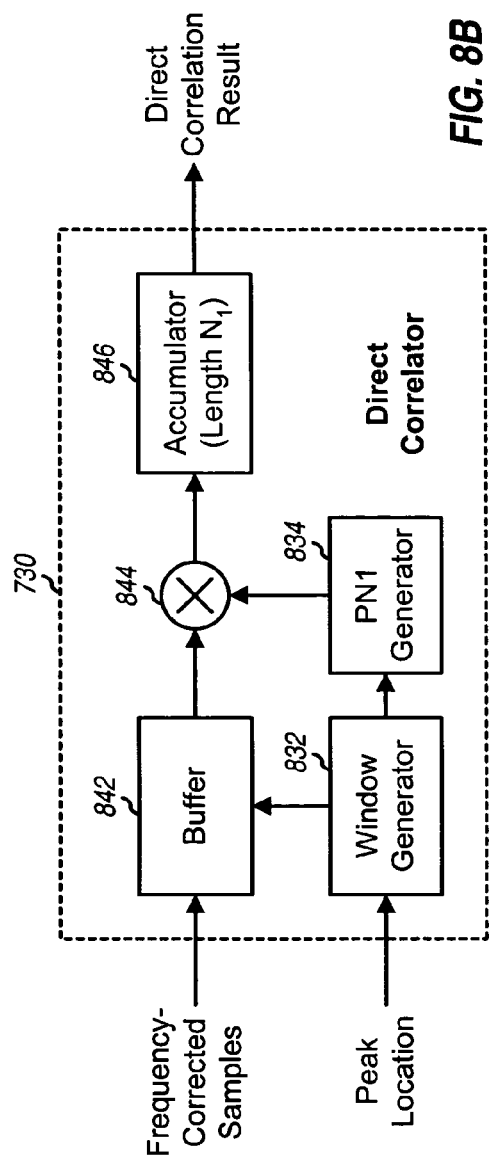
FIG. 8B shows a direct correlator for TDM pilot1.

FIG. 8B shows a block diagram of an embodiment of direct correlator 730 for TDM pilot1. Within direct correlator 730, a buffer 842 stores the received samples. When the peak of the delayed correlation for TDM pilot1 has been detected, a window generator 832 determines the uncertainty window and provides controls to evaluate each of the pilot-1 hypotheses. Generator 832 provides a time offset and a PN1 sequence for each pilot-1 hypothesis. Buffer 842 provides the proper sequence of (conjugated) samples for each pilot-1 hypothesis based on the indicated time offset. A PN generator 834 generates the proper PN1 sequence at the indicated time offset. A multiplier 844 multiplies the samples from buffer 842 with the PN 1 sequence from PN generator 834. For each pilot-1 hypothesis, an accumulator 846 accumulates the $N_{1d}$ results from multiplier 844 and provides the direct correlation result for that hypothesis.

Direct correlator 750 for TDM pilot2 may be implemented in similar manner as direct correlator 730 for TDM pilot1, albeit with the following differences. Generator 832 generates the controls to evaluate the $K_2$ detected TDM pilot1 instances from peak detector 732 instead of the $K_1$ time offsets within the uncertainty window. PN generator 834 generates the proper PN2 sequence instead of the PN1 sequence. Accumulator 846 performs accumulation over $N_2$ samples instead of $N_{1d}$ samples.

The signal acquisition techniques described herein may be implemented by various means. For example, these techniques may be implemented in hardware, software, or a combination thereof. For a hardware implementation, the processing units used to generate and transmit the TDM pilot(s) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to perform acquisition may also be implemented within one or more ASICs, DSPs, and so on.

For a software implementation, the signal acquisition techniques may be implemented with modules (e.g., procedures, functions, and so on) that perform the functions described herein. The software codes may be stored in a memory unit (e.g., memory unit 542 or 592 in FIG. 5) and executed by a processor (e.g., controller 540 or 590). The memory unit may be implemented within the processor or external to the processor, in which case it can be communicatively coupled to the processor via various means as is known in the art.

As used herein, OFDM may also include an orthogonal frequency division multiple access (OFDMA) architecture where multiple users share the OFDM channels.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting pilots in a communication system, comprising:
   generating a first time division multiplexed (TDM) pilot;
   identifying a pseudo-random number (PN) sequence from a set of possible PN sequences for a second TDM pilot:
   generating the second TDM pilot based at least in part on the PN sequence, wherein an identity of a transmitting entity of the first and second TDM pilots is associated with the PN sequence;
   transmitting the first TDM pilot in a first portion of each transmission interval for the first and second TDM pilots; and
   transmitting the second TDM pilot in a second portion of said each transmission interval.

2. The method of claim 1, wherein the generating the first TDM pilot comprises
   generating a pilot sequence, and
   generating the first TDM pilot based on at least one instance of the pilot sequence.

3. The method of claim 1, wherein the generating the second TDM pilot comprises
   generating a pilot sequence based on the PN sequence, and
   generating the second TDM pilot based on at least one instance of the pilot sequence.

4. The method of claim 1, wherein the generating the first TDM pilot comprises generating the first TDM pilot in frequency domain based on a first set of pilot symbols for a first set of subcarriers, and wherein the generating the second TDM pilot comprises generating the second TDM pilot in the frequency domain based on a second set of pilot symbols for a second set of subcarriers.

5. The method of claim 1, wherein the transmitting the second TDM pilot comprises transmitting the second TDM pilot in the second portion, next to the first portion, of said each transmission interval.

6. The method of claim 1, wherein the generating the first TDM pilot comprises
   applying a pilot sequence to multiple subcarriers, and
   generating the first TDM pilot based on the pilot sequence applied to the multiple subcarriers.

7. The method of claim 6, further comprising:
   identifying the pilot sequence, from a set of pilot sequences available for the first TDM pilot, based on the identity of the transmitting entity.

8. The method of claim 6, further comprising:
   identifying the pilot sequence and the PN sequence based on the identity of the transmitting entity, the pilot sequence being from a set of pilot sequences available for the first TDM pilot.

9. The method of claim 1, wherein the generating the second TDM pilot comprises
   applying the PN sequence to multiple subcarriers, and
   generating the second TDM pilot based on the PN sequence applied to the multiple subcarriers.

10. The method of claim 1, wherein the identifying the PN sequence comprises
    identifying the PN sequence, from the set of possible PN sequences for the second TDM pilot, based on the identity of the transmitting entity.

11. The method of claim 1, wherein the generating the first TDM pilot comprises generating a first orthogonal frequency division multiplexing (OFDM) symbol comprising the first TDM pilot, and wherein the generating the second TDM pilot comprises generating a second OFDM symbol comprising the second TDM pilot.

12. The method of claim 11, wherein the generating the first OFDM symbol comprises
    applying a pilot sequence to multiple subcarriers, and
    generating the first OFDM symbol comprising the pilot sequence applied to the multiple subcarriers.

13. The method of claim 11, wherein the generating the second OFDM symbol comprises
    applying the PN sequence to multiple subcarriers, and
    generating the second OFDM symbol comprising the PN sequence applied to the multiple subcarriers.

14. The method of claim 11, wherein the transmitting the first TDM pilot comprises transmitting the first OFDM symbol in a first symbol period of said each transmission interval, and wherein the transmitting the second TDM pilot comprises transmitting the second OFDM symbol in a second symbol period of said each transmission interval.

15. The method of claim 1, further comprising:
generating a frequency division multiplexed (FDM) pilot; and
transmitting the FDM pilot in a third portion of said each transmission interval.

16. The method of claim 1, wherein the transmitting entity is a base station for a cell.

17. A method of transmitting pilots in a communication system, comprising:
generating a first time division multiplexed (TDM) pilot based at least in part on a first pseudo-random number (PN) sequence in a set of possible first PN sequences for the first TDM pilot;
generating a second TDM pilot based at least in part on a second PN sequence in a set of second PN sequences associated with the first PN sequence;
transmitting the first TDM pilot in a first portion of each transmission interval for the first and second TDM pilots; and
transmitting the second TDM pilot in a second portion of said each transmission interval.

18. The method of claim 17, wherein the generating the first TDM pilot comprises generating the first TDM pilot based on the first PN sequence in time domain, and wherein the generating the second TDM pilot comprises generating the second TDM pilot based on the second PN sequence in time domain.

19. The method of claim 17, wherein the generating the first TDM pilot comprises generating the first TDM pilot in frequency domain based on a first set of pilot symbols for a first set of subcarriers, and wherein the generating the second TDM pilot comprises generating the second TDM pilot in the frequency domain based on a second set of pilot symbols for a second set of subcarriers.

20. The method of claim 17, wherein the generating the first TDM pilot comprises
generating a pilot sequence based on the first PN sequence, and
generating the first TDM pilot based on at least one instance of the pilot sequence.

21. The method of claim 20, wherein the generating the pilot sequence comprises
generating the pilot sequence based on the first PN sequence and having a length equal to the length of the first PN sequence.

22. The method of claim 17, wherein the generating the first TDM pilot comprises
generating the first TDM pilot based on a different first PN sequence for each of a plurality of transmission intervals.

23. The method of claim 17, further comprising:
identifying the first PN sequence from among the set of possible first PN sequences, the first PN sequence corresponding to a code offset selected from among a plurality of possible code offsets.

24. The method of claim 17, wherein the generating the second TDM pilot comprises
generating a pilot sequence based on the second PN sequence, and
generating the second TDM pilot based on at least one instance of the pilot sequence.

25. The method of claim 24, wherein the generating the pilot sequence comprises
generating the pilot sequence based on the second PN sequence and having a length equal to the length of the second PN sequence.

26. The method of claim 24, wherein the generating the pilot sequence comprises
generating the pilot sequence based on the second PN sequence and having a longer length than a pilot sequence for the first TDM pilot.

27. The method of claim 17, further comprising:
generating a third TDM pilot based on a third PN sequence; and
transmitting the third TDM pilot in a third portion of said each transmission interval.

28. The method of claim 17, further comprising:
generating a frequency division multiplexed (FDM) pilot; and
transmitting the FDM pilot in a third portion of said each transmission interval.

29. The method of claim 17, further comprising:
generating a frequency division multiplexed (FDM) pilot based on the second PN sequence; and
transmitting the FDM pilot in a third portion of said each transmission interval.

30. The method of claim 17, further comprising:
generating a frequency division multiplexed (FDM) pilot based on a third PN sequence; and
transmitting the FDM pilot in a third portion of said each transmission interval.

31. The method of claim 17, further comprising:
identifying the first PN sequence from among the set of possible first PN sequences; and
identifying the second PN sequence from among the set of second PN sequences associated with the first PN sequence.

32. The method of claim 17, further comprising:
identifying the second PN sequence assigned to a base station transmitting the first and second TDM pilots, wherein neighboring base stations in the system are assigned different second PN sequences.

33. The method of claim 17, wherein the generating the second TDM pilot comprises
selecting the second PN sequence from among a plurality of second PN sequences assigned to a base station, wherein each of the plurality of second PN sequences corresponds to a different data value.

34. The method of claim 17, further comprising:
identifying the first and second PN sequences based on an identity of a transmitting entity of the first and second TDM pilots.

35. A method of transmitting pilots in a communication system, comprising:
identifying a pseudo-random number (PN) sequence for each of a plurality of time division multiplexed (TDM) pilots from a set of PN sequences available for each TDM pilot;
generating the plurality of TDM pilots based on a plurality of PN sequences identified for the plurality of TDM pilots wherein an identity of a transmitting entity of the plurality of TDM pilots is associated with the plurality of PN sequences; and
transmitting the plurality of TDM pilots in a plurality of time intervals of each transmission interval with TDM pilot transmission.

36. The method of claim 35, wherein the identifying comprises
identifying a first PN sequence for a first TDM pilot from among a set of PN sequences available for the first TDM pilot; and
for each remaining TDM pilot among the plurality of TDM pilots, determining a subset of PN sequences associated with at least one PN sequence used for at least one other TDM pilot, and identifying a PN sequence for the remaining TDM pilot from among the subset of PN sequences.

37. An apparatus in a communication system, comprising:
at least one processor operative to generate a first time division multiplexed (TDM) pilot based at least in part on a first pseudo-random number (PN) sequence in a set of possible first PN sequences for the first TDM pilot, to generate a second TDM pilot based at least in part on a second PN sequence in a set of second PN sequences associated with the first PN sequence,
to multiplex the first TDM pilot in a first portion of each transmission interval for the first and second TDM pilots, and to multiplex the second TDM pilot in a second portion of said each transmission interval.

38. The apparatus of claim 37, wherein the at least one processor is operative to generate a pilot sequence based on the second PN sequence, and to generate the second TDM pilot based on at least one instance of the pilot sequence.

39. The apparatus of claim 37, wherein the at least one processor is operative to identify the first PN sequence from among the set of possible first PN sequences and to identify the second PN sequence from among the set of second PN sequences associated with the first PN sequence.

40. The apparatus of claim 37, further comprising:
a transmitter unit operative to transmit the first and second TDM pilots aligned in time with first and second TDM pilots from at least one other base station.

41. The apparatus of claim 37, further comprising:
a transmitter unit operative to transmit the first and second TDM pilots asynchronously with respect to first and second TDM pilots from at least one other base station.

42. The apparatus of claim 37, further comprising:
a transmitter unit operative to transmit the first and second TDM pilots staggered in time with respect to first and second TDM pilots from at least one other base station.

43. The apparatus of claim 42, wherein the first and second TDM pilots for each base station are transmitted in a time interval assigned to the base station.

44. The apparatus of claim 42, wherein neighboring base stations in the system use the same first PN sequence and the same second PN sequence.

45. The apparatus of claim 37, wherein neighboring base stations in the system are assigned different second PN sequences.

46. The apparatus of claim 37, wherein the communication system utilizes orthogonal frequency division multiplexing (OFDM).

47. The apparatus of claim 37, wherein the at least one processor is operative to identify the first and second PN sequences based on an identity of a transmitting entity of the first and second TDM pilots.

48. An apparatus in a communication system, comprising:
means for generating a first time division multiplexed (TDM) pilot based at least in part on a first pseudo-random number (PN) sequence in a set of possible first PN sequences for the first TDM pilot;
means for generating a second TDM pilot based at least in part on a second PN sequence in a set of second PN sequences associated with the first PN sequence;
means for transmitting the first TDM pilot in a first portion of each transmission interval for the first and second TDM pilots; and
means for transmitting the second TDM pilot in a second portion of said each transmission interval.

49. The apparatus of claim 48, wherein the means for generating the second TDM pilot comprises
means for generating a pilot sequence based on the second PN sequence and
means for generating the second TDM pilot based on at least one instance of the pilot sequence.

50. The apparatus of claim 48, wherein neighboring base stations in the system are assigned different second PN sequences.

51. The apparatus of claim 48, further comprising:
means for identifying the first and second PN sequences based on an identity of a transmitting entity of the first and second TDM pilots.

52. An apparatus in a communication system, comprising:
means for generating a first time division multiplexed (TDM) pilot;
means for identifying a pseudo-random number (PN) sequence from a set of possible PN sequences for a second TDM pilot:
means for generating the second TDM pilot based at least in part on the PN sequence, wherein an identity of a transmitting entity of the first and second TDM pilots is associated with the PN sequence;
means for transmitting the first TDM pilot in a first portion of each transmission interval for the first and second TDM pilots; and
means for transmitting the second TDM pilot in a second portion of said each transmission interval.

53. The apparatus of claim 52, wherein the means for generating the first TDM pilot comprises
means for generating a pilot sequence, and
means for generating the first TDM pilot based on at least one instance of the pilot sequence.

54. The apparatus of claim 52, wherein the means for generating the second TDM pilot comprises
means for generating a pilot sequence based on the PN sequence, and
means for generating the second TDM pilot based on at least one instance of the pilot sequence.

55. The apparatus of claim 52, wherein the means for generating the first TDM pilot comprises
means for applying a pilot sequence to multiple subcarriers, and
means for generating the first TDM pilot based on the pilot sequence applied to the multiple subcarriers.

56. The apparatus of claim 55, further comprising:
means for identifying the pilot sequence, from a set of pilot sequences available for the first TDM pilot, based on the identity of the transmitting entity.

57. The apparatus of claim 55, further comprising:
means for identifying the pilot sequence and the PN sequence based on the identity of the transmitting entity, the pilot sequence being from a set of pilot sequences available for the first TDM pilot.

58. The apparatus of claim 52, wherein the means for generating the second TDM pilot comprises
means for applying the PN sequence to multiple subcarriers, and
means for generating the second TDM pilot based on the PN sequence applied to the multiple subcarriers.

59. The apparatus of claim 52, wherein the means for identifying the PN sequence comprises
means for identifying the PN sequence, from the set of possible PN sequences for the second TDM pilot, based on the identity of the transmitting entity.

60. The apparatus of claim 52, wherein the means for generating the first TDM pilot comprises means for generating a first orthogonal frequency division multiplexing (OFDM) symbol comprising the first TDM pilot, and wherein the means for generating the second TDM pilot comprises means for generating a second OFDM symbol comprising the second TDM pilot.

61. The apparatus of claim 60, wherein the means for generating the first OFDM symbol comprises
means for applying a pilot sequence to multiple subcarriers, and
means for generating the first OFDM symbol comprising the pilot sequence applied to the multiple subcarriers.

62. The apparatus of claim 60, wherein the means for generating the second OFDM symbol comprises
means for applying the PN sequence to multiple subcarriers, and
means for generating the second OFDM symbol comprising the PN sequence applied to the multiple subcarriers.

63. The apparatus of claim 60, wherein the means for transmitting the first TDM pilot comprises means for transmitting the first OFDM symbol in a first symbol period of said each transmission interval, and wherein the means for transmitting the second TDM pilot comprises means for transmitting the second OFDM symbol in a second symbol period of said each transmission interval.

64. The apparatus of claim 52, further comprising:
means for generating a frequency division multiplexed (FDM) pilot; and
means for transmitting the FDM pilot in a third portion of said each transmission interval.

65. The apparatus of claim 52, wherein the transmitting entity is a base station for a cell.

66. An apparatus in a communication system, comprising:
at least one processor configured to generate a first time division multiplexed (TDM) pilot, to identify a pseudo-random number (PN) sequence from a set of possible PN sequences for a second TDM pilot, to generate the second TDM pilot based at least in part on the PN sequence, wherein an identity of a transmitting entity of the first and second TDM pilots is associated with the PN sequence, to send the first TDM pilot in a first portion of each transmission interval for the first and second TDM pilots and to send the second TDM pilot in a second portion of said each transmission interval.

67. The apparatus of claim 66, wherein the at least one processor is configured to generate a pilot sequence and to generate the first TDM pilot based on at least one instance of the pilot sequence.

68. The apparatus of claim 66, wherein the at least one processor is configured to generate a pilot sequence based on the PN sequence and to generate the second TDM pilot based on at least one instance of the pilot sequence.

69. The apparatus of claim 66, wherein the at least one processor is configured to apply a pilot sequence to multiple subcarriers and to generate the first TDM pilot with the pilot sequence applied to the multiple subcarriers.

70. The apparatus of claim 69, wherein the at least one processor is configured to identify the pilot sequence, from a set of pilot sequences available for the first TDM pilot, based on the identity of the transmitting entity.

71. The apparatus of claim 69, wherein the at least one processor is configured to identify the pilot sequence and the PN sequence based on the identity of the transmitting entity, the pilot sequence being from a set of pilot sequences available for the first TDM pilot.

72. The apparatus of claim 66, wherein the at least one processor is configured to apply the PN sequence to multiple subcarriers and to generate the second TDM pilot with the PN sequence applied to the multiple subcarriers.

73. The apparatus of claim 66, wherein the at least one processor is configured to identify the PN sequence, from the set of possible PN sequences for the second TDM pilot, based on the identity of the transmitting entity.

74. The apparatus of claim 66, wherein the at least one processor is configured to generate a first orthogonal frequency division multiplexing (OFDM) symbol comprising the first TDM pilot and to generate a second OFDM symbol comprising the second TDM pilot.

75. The apparatus of claim 74, wherein the at least one processor is configured to apply a pilot sequence to multiple subcarriers and to generate the first OFDM symbol comprising the pilot sequence applied to the multiple subcarriers.

76. The apparatus of claim 74, wherein the at least one processor is configured to apply the PN sequence to multiple subcarriers and to generate the second OFDM symbol comprising the PN sequence applied to the multiple subcarriers.

77. The apparatus of claim 74, wherein the at least one processor is configured to transmit the first OFDM symbol in a first symbol period of said each transmission interval and to transmit the second OFDM symbol in a second symbol period of said each transmission interval.

78. The apparatus of claim 66, wherein the at least one processor is configured to generate a frequency division multiplexed (FDM) pilot and to transmit the FDM pilot in a third portion of said each transmission interval.

79. The apparatus of claim 66, wherein the transmitting entity is a base station for a cell.

80. A computer program product, comprising:
a non-transitory processor-readable medium comprising:
code for causing at least one processor to generate a first time division multiplexed (TDM) pilot,
code for causing the at least one processor to identify a pseudo-random number (PN) sequence from a set of possible PN sequences for a second TDM pilot,
code for causing the at least one processor to generate the second TDM pilot based at least in part on the PN sequence, wherein an identity of a transmitting entity of the first and second TDM pilots is associated with the PN sequence,
code for causing the at least one processor to send the first TDM pilot in a first portion of each transmission interval for the first and second TDM pilots, and
code for causing the at least one processor to send the second TDM pilot in a second portion of said each transmission interval.

81. A computer program product, comprising:
a non-transitory processor-readable medium comprising:
code for causing at least one processor to generate a first time division multiplexed (TDM) pilot based on a first pseudo-random number (PN) sequence in a set of possible first PN sequences for the first TDM pilot,
code for causing the at least one processor to generate a second TDM pilot based on a second PN sequence in a set of second PN sequences associated with the first PN sequence,
code for causing the at least one processor to transmit the first TDM pilot in a first portion of each transmission interval for the first and second TDM pilots, and
code for causing the at least one processor to transmit the second TDM pilot in a second portion of said each transmission interval.

* * * * *